(12) United States Patent
Rosenberg et al.

(10) Patent No.: US 6,894,678 B2
(45) Date of Patent: *May 17, 2005

(54) CURSOR CONTROL USING A TACTILE FEEDBACK DEVICE

(75) Inventors: Louis B. Rosenberg, Pleasanton, CA (US); Jonathan L. Beamer, Menlo Park, CA (US); Adam C. Braun, Sunnyvale, CA (US); Dean C. Chang, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 09/935,102

(22) Filed: Aug. 21, 2001

(65) Prior Publication Data

US 2002/0003528 A1 Jan. 10, 2002

Related U.S. Application Data

(60) Continuation of application No. 09/343,940, filed on Jun. 30, 1999, now Pat. No. 6,288,705, which is a division of application No. 09/924,462, filed on Aug. 23, 1997, now Pat. No. 6,252,579.

(51) Int. Cl.[7] .............................................. G09G 5/08
(52) U.S. Cl. ......................... 345/157; 345/856; 345/163
(58) Field of Search ................................ 345/856, 145, 345/156, 157, 159, 161, 163; 463/30

(56) References Cited

U.S. PATENT DOCUMENTS

| 2,972,140 A | 2/1961 | Hirsch |
| 3,919,691 A | 11/1975 | Noll |
| 4,127,752 A | 11/1978 | Lowthorp |

(Continued)

FOREIGN PATENT DOCUMENTS

| EP | 0626634 A2 | 11/1994 |
| EP | 875819 A1 | 4/1998 |
| JP | H2-185278 | 7/1990 |

(Continued)

OTHER PUBLICATIONS

B. Hannaford et al., "Force–Feedback Cursor Control," NASA Tech Briefs, vol. 13, No. 11, Item #21, 1989, pp. 1–4.

L. Rosenberg et al., "Commercially Viable Force Feedback Controller for Individuals w/Neuromotor Disabilities," Wright Patterson AFB, 1996, pp. 1–33.

(Continued)

*Primary Examiner*—Kent Chang

(57) ABSTRACT

A mouse interface device and method for providing enhanced cursor control and indexing cursor control with force feedback. A force feedback interface device includes a manipulandum, such as a mouse, that is moveable in a local workspace. The device is coupled to a host computer that displays a cursor in a graphical environment, such as a GUI, on a display screen. A cursor position in the display frame is reported to the host computer derived from a reference position of the mouse in the local frame, and the host displays the cursor; for example, the cursor position may be scaled by a ballistics algorithm based on mouse velocity to allow fine positioning or coarse motion of the cursor. A force is output on the mouse based on interactions in the GUI, the force being determined based on mouse reference data or cursor ballistic data, depending on the type of force, to reduce distortion between visual and force outputs. Assistive forces can alternatively be output to achieve the enhanced cursor control. Indexing features allow control of the cursor when an offset between local and display frames exists, allow the user to reduce the offset, and reduce disconcerting collisions of the mouse with physical workspace limits.

21 Claims, 14 Drawing Sheets

U.S. PATENT DOCUMENTS

| | | |
|---|---|---|
| 4,148,014 A | 4/1979 | Burson |
| 4,262,549 A | 4/1981 | Schwellenbach |
| 4,333,070 A | 6/1982 | Barnes |
| 4,398,889 A | 8/1983 | Lam et al. |
| 4,464,117 A | 8/1984 | Foerst |
| 4,477,043 A | 10/1984 | Repperger |
| 4,484,191 A | 11/1984 | Vavra |
| 4,654,648 A | 3/1987 | Herrington et al. |
| 4,734,685 A | 3/1988 | Watanabe |
| 4,782,327 A | 11/1988 | Kley et al. |
| 4,800,721 A | 1/1989 | Cemenska et al. |
| 4,823,634 A | 4/1989 | Culver |
| 4,839,838 A | 6/1989 | LaBiche et al. |
| 4,868,549 A | 9/1989 | Affinito et al. |
| 4,885,565 A | 12/1989 | Embach |
| 4,935,728 A | 6/1990 | Kley |
| 4,949,119 A | 8/1990 | Moncrief et al. |
| 5,022,384 A | 6/1991 | Freels |
| 5,044,956 A | 9/1991 | Behensky |
| 5,065,145 A | 11/1991 | Purcell |
| 5,076,517 A | 12/1991 | Ferranti et al. |
| 5,095,303 A | 3/1992 | Clark et al. |
| 5,107,080 A | 4/1992 | Rosen |
| 5,116,180 A | 5/1992 | Fung et al. |
| 5,146,566 A | 9/1992 | Hollis, Jr. et al. |
| 5,165,897 A | 11/1992 | Johnson |
| 5,175,459 A | 12/1992 | Danial et al. |
| 5,181,181 A | 1/1993 | Glynn |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,193,963 A | 3/1993 | McAffee et al. |
| 5,195,179 A | 3/1993 | Tokunaga |
| 5,204,600 A | 4/1993 | Kahkoska |
| 5,220,260 A | 6/1993 | Schuler |
| 5,223,776 A | 6/1993 | Radke et al. |
| 5,264,768 A | 11/1993 | Gregory et al. |
| 5,264,836 A | 11/1993 | Rubin |
| 5,283,970 A | 2/1994 | Aigner |
| 5,286,203 A | 2/1994 | Fuller et al. |
| 5,296,846 A | 3/1994 | Ledley |
| 5,296,871 A | 3/1994 | Paley |
| 5,298,890 A | 3/1994 | Kanamaru et al. |
| 5,313,230 A | 5/1994 | Venolia et al. |
| 5,355,148 A | 10/1994 | Anderson |
| 5,374,942 A | 12/1994 | Gilligan et al. |
| 5,381,080 A | 1/1995 | Schnell et al. |
| 5,389,865 A | 2/1995 | Jacobus et al. |
| 5,396,266 A | 3/1995 | Brimhall |
| 5,398,044 A | 3/1995 | Hill |
| 5,405,152 A | 4/1995 | Katanics et al. |
| 5,414,337 A | 5/1995 | Schuler |
| 5,436,622 A | 7/1995 | Gutman et al. |
| 5,436,638 A | 7/1995 | Bolas et al. |
| 5,437,607 A | 8/1995 | Taylor |
| 5,457,479 A | 10/1995 | Cheng |
| 5,471,571 A | 11/1995 | Smith et al. |
| 5,477,237 A | 12/1995 | Parks |
| 5,513,100 A | 4/1996 | Parker et al. |
| 5,530,455 A | 6/1996 | Gillick et al. |
| 5,550,562 A | 8/1996 | Aoki et al. |
| 5,565,887 A | 10/1996 | McCambridge et al. |
| 5,570,111 A | 10/1996 | Barrett et al. |
| 5,575,761 A | 11/1996 | Hajianpour |
| 5,576,727 A | 11/1996 | Rosenberg et al. |
| 5,589,828 A | 12/1996 | Armstrong |
| 5,589,854 A | 12/1996 | Tsai |
| 5,596,347 A | 1/1997 | Robertson |
| 5,623,582 A | 4/1997 | Rosenberg |
| 5,625,576 A | 4/1997 | Massie et al. |
| 5,629,594 A | 5/1997 | Jacobus et al. |
| 5,642,469 A | 6/1997 | Hannaford et al. |
| 5,643,087 A | 7/1997 | Marcus et al. |
| 5,666,138 A | 9/1997 | Culver |
| 5,666,473 A | 9/1997 | Wallace |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,696,532 A | 12/1997 | Caprara |
| 5,696,535 A | 12/1997 | Rutledge et al. |
| 5,709,219 A | 1/1998 | Chen et al. |
| 5,714,978 A | 2/1998 | Yamanaka et al. |
| 5,721,566 A | 2/1998 | Rosenberg et al. |
| 5,734,373 A | 3/1998 | Rosenberg et al. |
| 5,736,978 A | 4/1998 | Hasser et al. |
| 5,742,278 A | 4/1998 | Chen et al. |
| 5,745,715 A | 4/1998 | Pickover et al. |
| 5,754,023 A | 5/1998 | Roston et al. |
| 5,757,358 A | 5/1998 | Osga |
| 5,760,764 A | 6/1998 | Martinelli |
| 5,767,839 A | 6/1998 | Rosenberg |
| 5,769,640 A | 6/1998 | Jacobus et al. |
| 5,771,037 A | 6/1998 | Jackson |
| 5,781,172 A | 7/1998 | Engel et al. |
| 5,784,052 A | 7/1998 | Keyson |
| 5,790,108 A | 8/1998 | Salcudean et al. |
| 5,802,353 A | 9/1998 | Avila et al. |
| 5,805,140 A | 9/1998 | Rosenberg et al. |
| 5,805,165 A | 9/1998 | Thorne, III et al. |
| 5,808,601 A | 9/1998 | Leah et al. |
| 5,808,603 A | 9/1998 | Chen |
| 5,825,308 A | 10/1998 | Rosenberg |
| 5,844,392 A | 12/1998 | Peurach et al. |
| 5,877,748 A | 3/1999 | Redlich |
| 5,889,672 A | 3/1999 | Schuler et al. |
| 5,956,484 A | 9/1999 | Rosenberg et al. |
| 5,959,613 A | 9/1999 | Rosenberg et al. |
| 5,973,689 A | 10/1999 | Gallery |
| 5,990,869 A | 11/1999 | Kubica et al. |
| 6,004,134 A | 12/1999 | Marcus et al. |
| 6,020,876 A | 2/2000 | Rosenberg et al. |
| 6,028,593 A | 2/2000 | Rosenberg et al. |
| 6,061,004 A | 5/2000 | Rosenberg |
| 6,067,077 A | 5/2000 | Martin et al. |
| 6,078,308 A | 6/2000 | Rosenberg et al. |
| 6,100,874 A | 8/2000 | Schena et al. |
| 6,111,577 A | 8/2000 | Zilles et al. |
| 6,160,489 A | 12/2000 | Perry et al. |
| 6,422,941 B1 | 7/2002 | Thorner et al. |

FOREIGN PATENT DOCUMENTS

| | | |
|---|---|---|
| JP | H4-8381 | 1/1992 |
| JP | H5-192449 | 8/1993 |
| JP | H7-24147 | 1/1995 |
| WO | WO9520788 | 8/1995 |
| WO | WO9532459 | 11/1995 |
| WO | WO9721160 | 6/1997 |
| WO | WO9731333 | 8/1997 |

OTHER PUBLICATIONS

Payette, Jule et al., "Evaluation of a Force Feedback (Haptic) Computer pointing Device in Zero Gravity," Dynamic Systems & Control Div. DSC–vol. 58, ASME 1996, pp. 547–553.

Colgate, J. Edward et al., "Implementation of Stiff Virtual Walls in Force–Reflecting Interfaces," Northwestern University, 1993, pp. 1–7.

Louis Rosenberg, "Perceptual Design of a Virtual Rigid Surface Contact," Stanford University, Wright Patterson AFB, 1993, pp. 1–40.

Louis Rosenberg et al., "The use of force feedback to enhance graphical user interfaces," Stereoscopic Displays and Virtual Reality Systems, III, Proc. SPIE, 1996, pp. 243–248.

Schmidt, Brian et al., "Application Areas for a Force–Feedback Joystick," DSC–vol. 49, Advances in Robotics, Mechatronics, and Haptic Interfaces, ASME 1993, pp. 47–54.

Minsky, Margaret et al., "Feeling and Seeing: Issues in Force Display," University of North Carolina, ACM 1990, pp. 235–242, 270.

Ramstein, Christophe, "Combining Haptic & Braille Technologies: Design Issues and Pilot Study," Assest '96, ACM 0–89791–776–6, 1996, pp. 37–44.

Munch, Stefan et al., "Intelligent Control for Haptic Displays," Eurographics '96, vol. 15, No. 3, Blackwell Publishers, 1996, pp. C–218 to C–226.

Wiker, Steven F. et al., "Development of Tactile Mice for Blind Access to Computers," Proc. of the Human Factors Society 35.sup.th Annual Meeting, 1991, pp. 708–712.

Akamatsu, Motoyuki et al., "Multimodal Mouse: A Mouse–Type Device with Tactile & Force Display," Presence, vol. 3, No. 1, 1994, pp. 73–80.

Ramstein, Christophe et al., "The Pantograph: A Large Workspace Haptic Device for a Multimodal Human–Computer Interaction," Computer–Human Interaction, CHI '94, 1994, pp. 1–3.

Kelley, A. J. et al., "On the Development of a Force–Feedback Mouse and it's Integration into a Graphical User Interface," 1994 Int'l Mechanical Engineering Congress and Exhibition, 1994, pp. 1–8.

Kelley, A. J. et al., "MagicMouse: Tactile and Kinesthetic Feedback in the Human–Computer Interface using an Electromagnetically Actuated Input/Out Device," University of British Columbia, 1993, pp. 1–27.

R. E. Ellis et al., "Design & Evaluation of a High–Performance Prototype Planar Haptic Interface," DSC–vol. 49, Advances in Robotics, Mechatronics, and Haptic Interfaces, ASME, 1993, pp. 55–64.

H. Iwata, "Artificial Reality with Force–Feedback" Computer Graphics, vol. 24, No. 4, 1990, pp. 165–170.

Adelstein, et al., "Design and Implementation of a Force Reflecting Manipulandum for Manual Control Research," NASA Ames Research 1992, pp. 1–26.

Hayward et al., "Design & Multi–Object Optimization of a Linkage for a Haptic Interface," Kluwer Academic Publishers, 1994, pp. 359–368.

Millman et al., "Design of a Four Degree–of–Freedom Force–Reflecting Manipulandum with a Specified Force/Torque Workspace," 1991, Int'l Conference on Robotics and Automation, pp. 1488–1492.

L.A. Jones et al, A Perceptual analysis of stiffness, Experimental Brain Research, 1990, pp. 150–156.

Tan et al., "Human Factaors for the Design of Force–Reflecting Haptic Interfaces", ASME WAM '94, 1994, pp. 1–11.

Ouh–young et al., "Using a Manipulator for Force Display in Molecular Docking", IEEE CH2555–1, 1988 pp. 1824–1829.

Kotoku et al, "EMID used in Telerobotic Systems", 1991, IROS '91, pp. 999–1004.

Tan et al., "Manual Resolution of Compliance when Work and Force cues are Minimized" DSC–vol. 49, ASME, 1993, pp. 99–104.

Buttolo et al., "Pen–Based Force Display for Precision Manipulation in Virtual Environments", IEEE 0–8186–7084–3, 1995, pp. 217–224.

Howe et al., "Task Performance with a Dextrous Teleoperated Hand System", vol. 1833, Proc. Of SPIE, 1992, pp. 1–9.

Atkinson et al., "Computing with Feeling", Compu. & Graphics, vol. 2, 1977, pp. 97–103.

Friedman et al., "Perception of Mechanical Properties at the Man–Machine Interface", IEEE CH2503–1, 1987, pp. 688–689.

Russo, "The Design and Implementaiton of a Three Degree–of–Freedom Force Output Joystick", Dept. of Mech. Eng., 1990, 33 pgs.

Batter et al., "Grope 1: A Computer Display to the Sense of Feel," IFIP Congress, 1971, pp. 759–763.

Adachi et al., "Sensory Evaluation of Virtual Haptic Push–Buttons," Tech, Res. Cntr., Suzuki Motor Corp, Japan, 1994, 7pgs.

Hannford et al., "Performance Evaluation of a Six–Axis Generalized Force–Reflecting Teleoperator", IEEE Trans. on Systems, Man, and Cybernetics, 1991, pp. 620–627.

Su et al., "The Virtual Panel Architecture: A 3D Gesture Framework", IEEE 0–7803–1363–1, 1993, 387–393.

Yokokohji, et al., "What ou can see is what you can feel–Development of a Visual Haptic Interface to Virtual Environment", IEEE 0–8186–7295–1, 1996, pp. 46–54.

Winey III, "Computer Simulated Visual and Tactile Feedback as an Aid to Manipulator and Vehicle Control", MIT 1981, pp. 2–79.

Kilpatrick, "The Use of a Kinesthetic Supplement in an Interactive Graphics System", University of North Carolina, 1976, pp. 1–175.

Rosenberg, "A Force Feedback Programming Primer", Immersion Corp., 1997, pp. 1–176.

Brooks, Jr. et al., "Haptic Displays for Scientific Visualization", Computer Graphics, vol. 24, No. 4, 1990, pp. 177–185.

Hirota et al., "Development of Surface Display", IEEE 0–7803–1363–1, 1993, pp. 256–262.

Rosenberg, "Virtual Haptic Overlays enhance performance in telepresence tasks", Wright–Patterson AFB, 1994, pp. 11.

Rosenberg, "Virtual Fixtures as Tools to enhance Operator Performance in Telepresence environments", SPIE Telemanipulator Technology, 1993, pp. 12.

Rosenberg et al., "Perceptual Decomposition of Virtual Haptic Surfaces", Proc. IEEE Symp. on Research Frontiers in Virtual Reality, 1993, pp. 8.

Salcudean, S.E., "On the development of a force–feedback mouse and its integration into a graphical user interface", University of British Columbia, Nov. 1994.

Salcudean, S.E., "Magicmouse: tactile and kinesthetic feedback in the human–computer interface using an electromagnetically actuated input/output device", Oct. 1993.

Ouh–young, et al., "Creating an Illusion of Feel: Control Issues in Force Display," Computer Science Dept., Univ. of North Carolina, Chapel Hill, Sep. 1989, pp. 1–14.

Patrick, "Design, Construction, and Testing of a Fingertip Tactile Display for Interaction with Virtual and Remote Environments," *Master of Science Thesis,* MIT, Aug. 1990, archived Nov. 8, 1990.

Calder, "Design of A Force–Feedback Touch–Introducing Actuator For Teleoperator Robot Control," *Bachelor of Science Thesis,* MIT, May 1983, archived Jun. 23, 1983.

Wiker, "Teletouch Display Development: Phase 1 Report," *Technical Report 1230,* Naval Ocean Systems Center, San Diego, Jul. 1988.

Bliss, "Optical–to–Tactile Image Conversion for the Blind," *IEEE Transactions on Man–Machine Systems,* vol. MMS–11, No. 1, Mar. 1970.

Johnson, "Shape–Memory Alloy Tactile Feedback Actuator," *Armstrong Aerospace Medical Research Laboratory,* AAMRL–TR–90–039, Aug., 1990.

Kontarinis et al., "Tactile Display of Vibratory Information in Teleoperation and Virtual Environments," Presence, 4(4):387–402, Harvard Univ., 1995.

Aukstakalnis et al., "Silicon Mirage: The Art and Science of Virtual Reality," ISBN 0–938151–82–7, pp. 129–180, 1992.

Eberhardt et al., "Inducing Dynamic Haptic Perception by The Hand: System Description and Some Results," DSC–vol. 55–1, *Dynamic Systems and Control:* vol. 1, ASME 1994.

Gobel et al., "Tactile Feedback Applied to Computer Mice," *International Journal of Human–Computer Interaction,* vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1004.

"Cyberman Technical Specification," *Logitech Cyberman SWIFT Supplement to Logitech Mouse Technical Reference and Programming Guide,* Apr. 5, 1994.

Ouhyoung et al., "The Development of A Low–Cost Force Feedback Joystick and Its Use in the Virtual Reality Environment," *Proceedings of the Third Pacific Conference on Computer Graphics and Applicaitons, Pacific Graphics '95,* Seoul, Korea, Aug. 21–24, 1995.

Kaczmarek et al., "Tactile Displays," *Virtual Environment Technologies,* Chap. 9, pp. 349–414.

Lake, "Cyberman from Logitech," at http://www.ibiblio.org/GameByets/issue21/greviews/cyberman.html, 1994.

"Component Maintenance Manual With Illustrated Parts List, Coaxial Control Shaker Part No. C–25502," Safe Flight Instrument Corporation, Revised Jan. 28, 2002 (3 pages).

"Technical Manual Overhaul Instructions With Parts Breakdown, Coaxial Control Shaker Part No. C–25502," Safe Flight Instrument Corporation, Revised Jul. 15, 1980 (23 pages).

Scannell, "Taking a Joystick Ride," *Computer Currents,* Boston Edition, vol. 9, No. 1, Nov. 1994.

Yamakita et al., "Tele–Virtual Reality of Dynamic Mechanical Model," *Proceedings of the 1992 IEEE/RSJ International Conference on Intelligent Robots and Systems,* Raleigh, NC, Jul. 7–10, 1992.

Noll, "Man–Machine Tactile," *SID Journal,* Jul./Aug. 1972 Issue.

Rosenberg, "Virtual Fixtures: Perceptual Overlays Enhance Operator Performance In Telepresence Tasks," *Ph.D. Dissertation,* Stanford University, Jun. 1994.

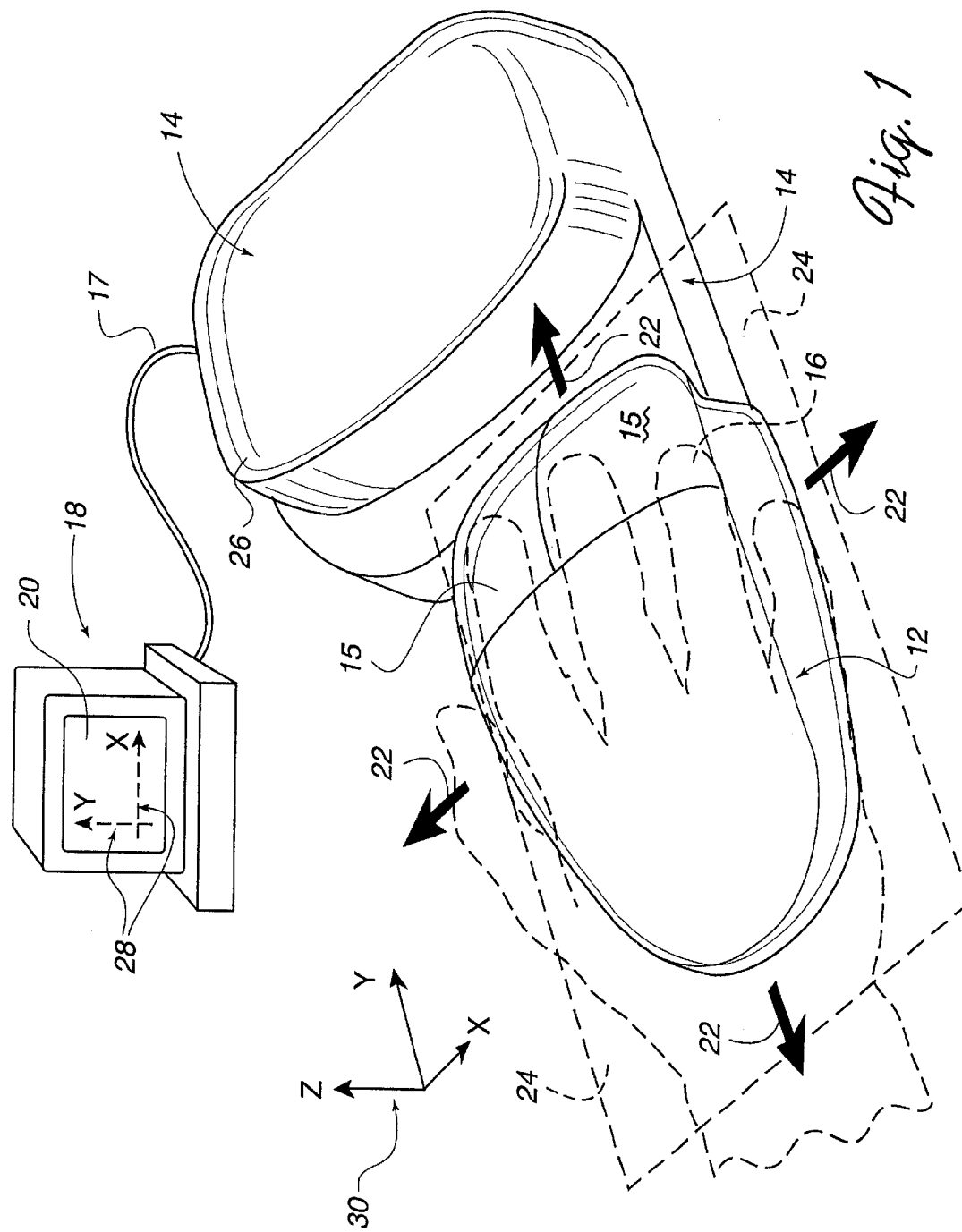

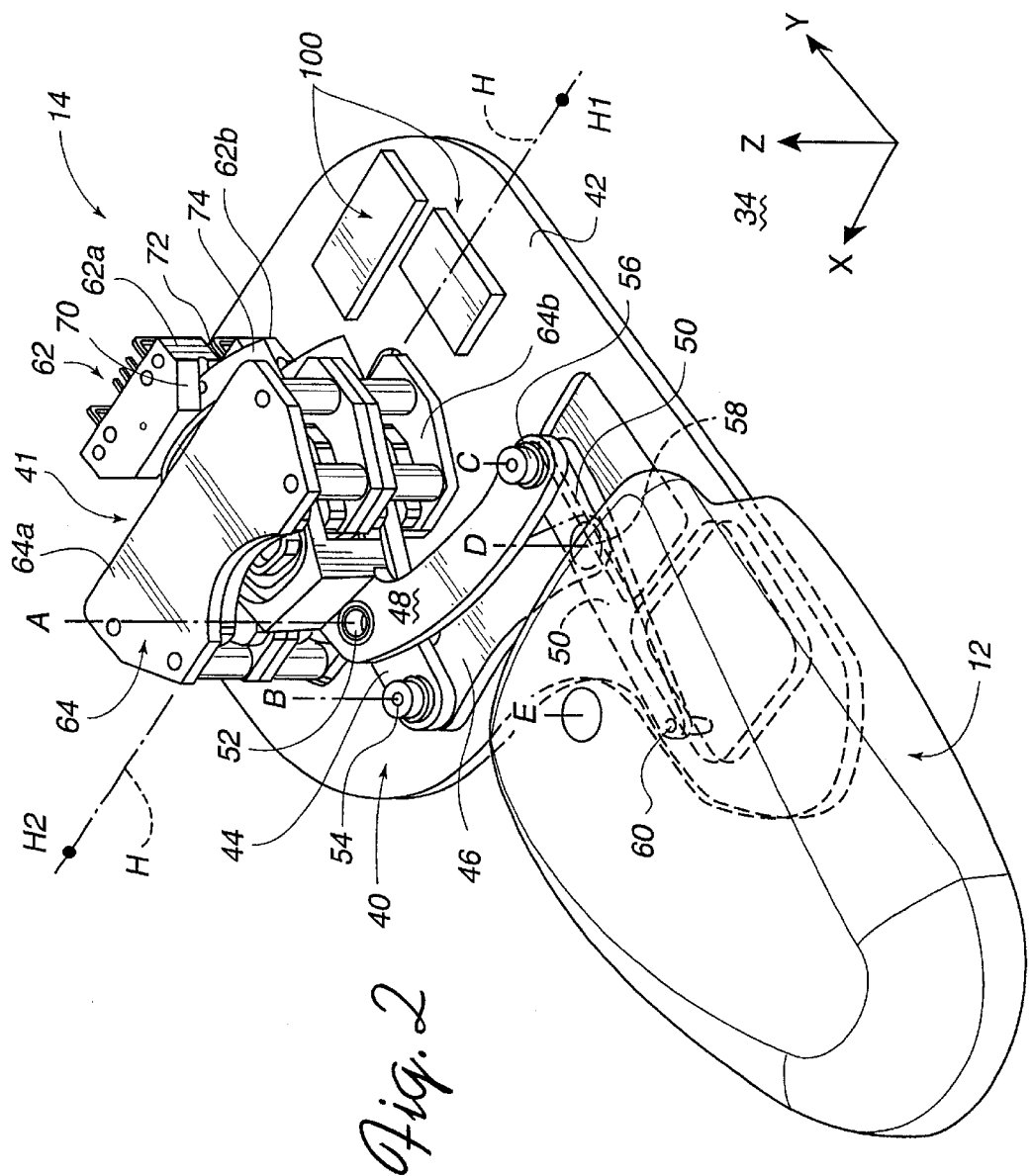

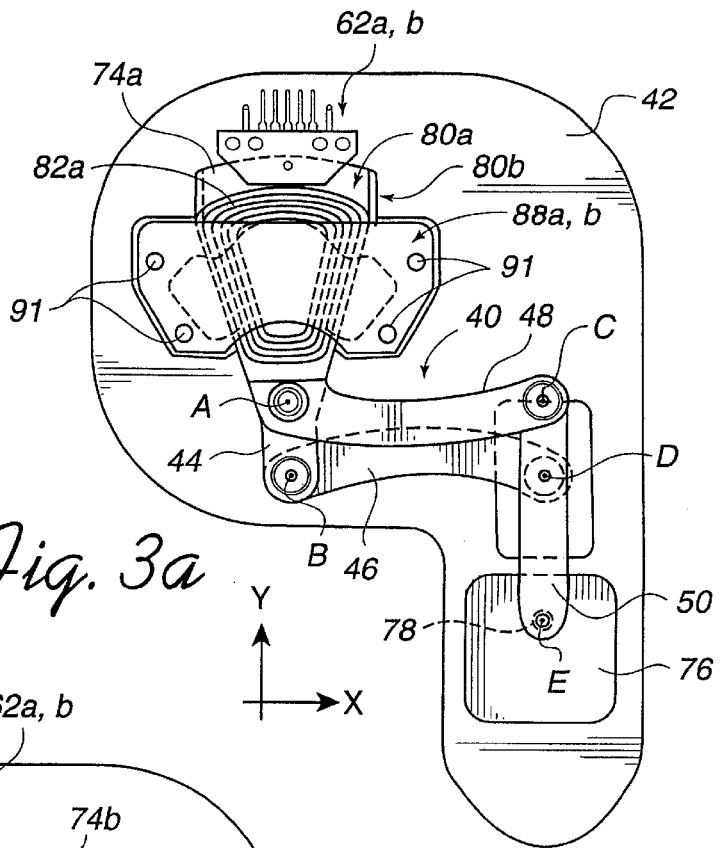
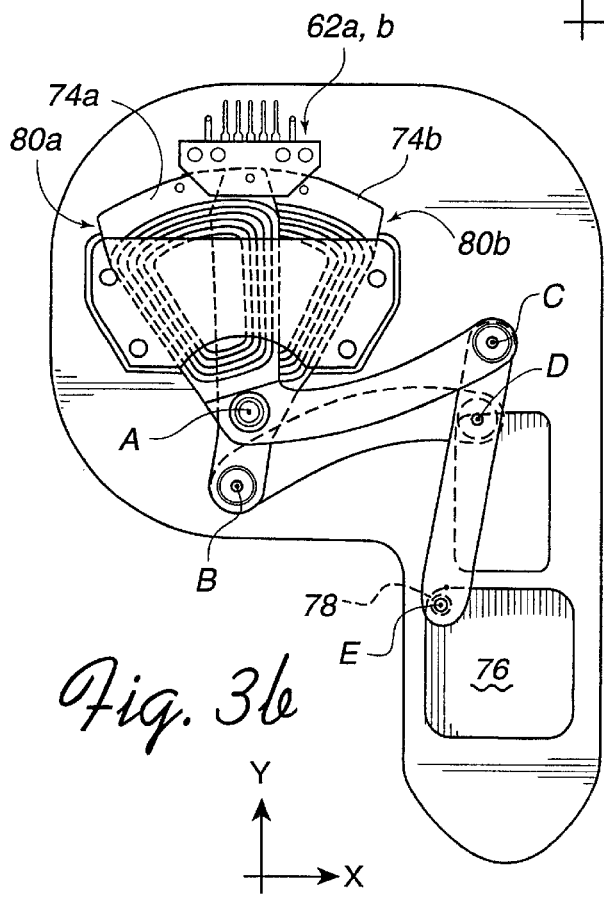
Fig. 3a
Fig. 3b

CURSOR CONTROL USING A TACTILE FEEDBACK DEVICE

This application is a continuation of application Ser. No. 09/343,940, filed Jun. 30, 1999, U.S. Pat. No. 6,288,705 entitled "Interface Device and Method for Providing Indexed Cursor Control with Force Feedback," which is a divisional of application Ser. No. 09/924,462, filed Aug. 23, 1997, now U.S. Pat. No. 6,252,579, both of which are incorporated herein by reference in their entireties.

This invention was made with Government support under Contract Number F41624-96-C-6029 awarded by the Department of Defense. The Government has certain rights in this invention.

BACKGROUND OF THE INVENTION

The present invention relates generally to interface devices for allowing humans to interface with computer systems, and more particularly to computer interface devices that allow the user to provide input to computer systems and provide force feedback to the user.

Computer systems are used extensively to implement many applications, such as word processing, data management, simulations, games, and other tasks. A computer system typically displays a visual environment to a user on a display screen or other visual output device. Users can interact with the displayed environment to perform functions on the computer, play a game, experience a simulated environment, use a computer aided design (CAD) system, etc. One visual environment that is particularly common is a graphical user interface (GUI). GUI's present visual images which describe various graphical metaphors of a program or operating system implemented on the computer. Common GUI's include the Windows™ operating system from Microsoft Corporation and the MacOS operating system from Apple Computer, Inc. The user typically moves a displayed, user-controlled graphical object, such as a cursor or pointer, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUI's are currently 2-dimensional as displayed on a computer screen; however, three dimensional (3-D) GUI's that present simulated 3-D environments on a 2-D screen can also be provided. Other programs or environments that may provide user-controlled graphical objects such as a cursor or a "view" controlled by the user include graphical "web pages" or other environments offered on the World Wide Web of the Internet, CAD programs, video games, virtual reality simulations, etc.

The user interaction with and manipulation of the computer environment is achieved using any of a variety of types of human-computer interface devices that are connected to the computer system controlling the displayed environment. In most systems, the computer updates the environment in response to the user's manipulation of a user-manipulatable physical object ("user object") that is included in the interface device, such as a mouse, joystick, etc. The computer provides feedback to the user utilizing the display screen and, typically, audio speakers.

A computer mouse is a common user object used to interact with a GUI or other graphical environment. A mouse (and other mouse-type devices such as a track ball) is typically used as a position control device in which displacement of the mouse in a planar workspace (e.g. on a mouse pad) is directly correlated to displacement of the user-controlled graphical object, such as a cursor, displayed on the screen. This displacement correlation may not be a one-to-one correspondence, since the cursor position may be scaled according to a constant mapping from the mouse position e.g., the mouse may be moved a distance of one inch on a mouse pad which causes the controlled cursor to move four inches across the screen. In most cases, small movements of the mouse are scaled to large motions of the cursor on the screen to allow the user to easily point to targets in all areas of the screen. The user can typically change the scaling or "pointer speed" of a cursor to a desired level, which is the ratio or scaling factor of cursor movement to mouse movement, using menus provided in the operating system or application program.

The scaled cursor movement in a GUI works well for coarse cursor motion, which is the broad, sweeping motion of the cursor that brings the cursor from one global area on the screen to another. Accuracy of cursor motion is not critical for coarse motion, but speed of the cursor is ideally, the cursor traverses the desired distance on the screen quickly and efficiently. For such tasks, it is valuable for the cursor to move a large distance with small motions of the physical mouse hardware. However, a problem occurs in mouse-type devices when the user wishes to move the cursor a short distance or in small increments ("fine positioning"). For tasks in which accurate positioning of the cursor is needed, such as target acquisition tasks, the large scaling of mouse movement to cursor movement is inadequate or even harmful. For example, the user may wish to move the cursor onto a GUI target such as an icon or menu item. If very small motions of the mouse result in large cursor motion, the user may simply lack the manual dexterity to acquire the target. Certain target acquisition tasks where the targets are very small can be particularly challenging even if the mapping between the cursor and the mouse is reasonable for most other cursor motion activities. For example, in drawing programs it is often required that a user position the cursor on a very small "point" or "node" on the screen; and in some cases, the target can be as small as a single display pixel. For such situations, a scaling that causes large motions of the cursor for small motions of the mouse may make a target acquisition task physically impossible for the user.

Mouse "ballistics" or "ballistic tracking" is typically used to alleviate the scaling problem for fine positioning of the cursor. Ballistics refers to the technique of varying the scaling between motion of a physical mouse and motion of a displayed cursor depending upon the velocity of the mouse in its workspace. The assumption is that if the user is moving the mouse very quickly, the user is likely performing a "coarse motion" task on the screen, and therefore the mouse driver scales small motions of the mouse to large motions of the cursor. Conversely, if the user is moving the mouse very slowly, the user is likely performing a fine positioning task on the screen, and the mouse driver scales small motions of the mouse to small motions of the cursor. Such a variable scaling technique is disclosed in U.S. Pat. No. 4,734,685 of Watanabe and U.S. Pat. No. 5,195,179 of Tokunaga.

Many algorithms can be used for mouse ballistics. The simplest method is to designate a threshold velocity such that if the mouse is moving faster than the threshold velocity, a large scaling of cursor position is made so that small motions of the mouse cause large motions of the cursor; and if the mouse is moving slower than the threshold velocity, a smaller scaling is made so that small motions of the mouse cause small motions of the cursor. A more sophisticated and more common method is to gradually change the scaling in accordance with mouse velocity using a continuous function. This can be a simple linear function, such as a direction relation between mouse speed and the distance the cursor moves for a given increment of mouse motion, or a non-linear function that is optimized in a particular way. The "mapping" of the cursor to the mouse is the method of translating the mouse position in its workspace to a cursor position on the display screen and may involve ballistics or other algorithms and scale factors.

A problem occurs when standard ballistics techniques are used with force feedback interface devices. Force feedback interface devices allow a user to experience forces on the manipulated user object based on interactions and events within the displayed graphical environment. Typically, computer-controlled motors or other actuators are used to output forces on the user object in provided degrees of freedom to simulate various sensations, such as an obstruction force when moving the cursor into a wall, a damping force to resist motion of the cursor, and a spring force to bias the cursor to move back toward a starting position of the spring.

Force feedback devices can be implemented in many forms, such as a joystick, mouse, steering wheel, etc.

When these and other types of forces are implemented in conjunction with mouse ballistics, a conflict occurs between the use of ballistics position and force feedback output. In general, force feedback is generated based directly on motion of the mouse while visual feedback such as movement of the cursor does not correspond directly with motion of the mouse due to scaling and ballistics. As explained above, 1 mm displacement of the mouse may cause different visual results in cursor motion based on the mouse velocity when using ballistics. Thus, when implementing forces in an interface device, motion of the mouse can no longer be consistently correlated to cursor motion on the screen due to the variable scaling. This is a particular problem for a force feedback mouse system because in general, feel sensations such as springs, surfaces, dampers, textures, masses, and other spatially related physical phenomenon rely on a constant, predictable mapping between the motion of the mechanical object (mouse), the forces generated on the mouse, and graphically displayed interactions on the screen (cursor motion).

For example, a spring sensation can be used when the user manipulates a cursor to stretch a graphically displayed element on the screen, such as a line in a drawing program or a window in a GUI. The user positions the cursor on the line, and moves the cursor to stretch the line. Visually, this stretch is displayed based on cursor motion. In addition, the accompanying spring sensation outputs a resistance force that increases linearly with displacement. Traditional force feedback systems would use displacement of the mouse in its workspace as the displacement magnitude required to calculate the spring force. If no ballistics are in effect, no problem exists because the cursor displacement used in the visual display has a consistent, constant mapping to the mouse displacement used in the force "display." However, if ballistics are used to map physical mouse motion to displayed cursor motion, the motion of the cursor varies depending upon mouse velocity, causing a potential conflict: the stretch displayed visually is based on the variable mapping adjusted by the ballistic algorithm, while the stretch force is based on pure mouse motion. This conflict becomes a problem when, for example, the user stretches a line very quickly in one direction from a starting position (both a mouse starting position and a screen starting position), changes to the opposite direction, and unstretches the line very slowly toward the starting position. The motion in the first direction has a large scaling of mouse motion to cursor motion, while the motion in the second direction has a small scaling of mouse motion to cursor motion. The user may move the mouse in its physical workspace exactly the same distance in both directions (returning to the mouse starting position), but on the screen the line might stretch very far (when moving fast), but then come back only a small distance (when moving slow). Thus, visually, the cursor did not return to the screen starting position.

Using a traditional mouse, this frequently occurs and is not a problem. However, on a force feedback mouse where force display is based on mouse motion and visual display is based on cursor motion, a disconcerting dichotomy is noticed by the user. Since the feel of the stretch is based on mouse motion, if the user stretches in one direction and returns to the starting position, the user feels stretching the line a given displacement and then unstretching the line that same displacement, with an end result of no stretch. But, on the screen where the cursor mapping is based on velocity, the user would see the line stretching far in one direction and then unstretching only a small amount in the opposite direction so that the cursor is not yet back to the starting position. The user would visually expect to still feel some stretched tension, but no such tension exists since the mouse is back at the starting position in its own workspace. Thus a problem is evident in force feedback mouse-type devices: ballistics are needed to allow dexterous cursor control, yet ballistics distorts the seeing-feeling relationship.

Thus, adjusting the mapping between physical mouse motion and displayed cursor motion makes sense for graphical display, but does not make sense for force feedback where physical realism is critical to effective sensation generation. Therefore, for force feedback mouse systems, it would be preferred to eliminate mouse ballistics. Unfortunately, such a force feedback mouse would not be optimized for both fine positioning and coarse motion, as is true of traditional mice.

In addition, mouse ballistics causes another problem that causes difficulty in force feedback mouse implementation. As described above, moving the mouse in one direction quickly and then moving it back in the other direction slowly creates a situation where the mouse hardware has returned to its starting position but the cursor may be far away from its starting position. This illustrates that the frame of the cursor and the frame of the mouse have shifted or become offset.

If this offset becomes too large, the user may not be able to reach some parts of the screen within the range of motion of the mouse. In a typical mouse, the offset is corrected through a process called "indexing." Indexing is achieved in a typical mouse by lifting the mouse off the table and repositioning it after the mouse has hit a limit, while the cursor remains fixed in position. This brings the mouse and the cursor frames back to a smaller, more comfortable offset. A force feedback mouse may have a limited workspace due to cost constraints and may not be able to be lifted off the table and repositioned. In addition, the mouse hitting a physical limit to its workspace is disconcerting for a user expecting realistic force feedback. Thus, traditional indexing may not be practical. However, since ballistics needs indexing to restore the frame offsets, and since ballistics and indexing are both traditional mouse techniques that conflict with typical force feedback functionality, a solution is needed that reconciles both the ballistics and the indexing problem in force feedback hardware.

SUMMARY OF THE INVENTION

The present invention is directed to a force feedback interface which allows enhanced cursor control and does not compromise the fidelity of force feedback. Various embodiments are presented which distinguish when a conflict between cursor control and force feedback occurs and compensates for such conflict, as well as compensating for any indexing problems occurring due to offsets in mouse and cursor movement frames.

More specifically, a method of the present invention provides enhanced cursor control using a force feedback interface device coupled to host computer. The host computer displays a cursor within a graphical environment, such as a GUI, on a display device. A position of a user-grasped manipulandum, such as a mouse, in a device workspace is read as a reference position. A cursor position is reported to the host computer derived from the reference position, and the host computer displays the cursor within the graphical environment at a position corresponding to the cursor position. It is determined whether the cursor interacts with the graphical environment as to cause a force to be output on the manipulandum, and, if so, a force is output on the manipulandum. At least one of the reported cursor position and the output force allows the user of the force feedback interface device to finely position the cursor within the graphical environment and coarsely move the cursor in the graphical environment without causing a distortion in the output forces as expected to be experienced by the user.

A number of embodiments are particularly described. In some embodiments, the cursor position reported to the host computer is the reference position modified or scaled to allow enhanced cursor control. For example, the cursor position can be a ballistic position that is the reference position modified by a ballistics algorithm such that cursor position is mapped to manipulandum position based on a scaling derived from a velocity of the manipulandum and allows enhanced cursor control. In other embodiments, other types of variable scaling or variable mapping can be used, such as a predictive scaling method that scales the cursor position based on whether a fine positioning mode is entered based on other criteria. In such ballistics or variable scaling/mapping embodiments, the realism of output forces is maintained by determining mouse-based forces based on the reference data (position and motion of the mouse) rather than the cursor position (ballistic) data. Preferably, a local microprocessor keeps track of both reference data (local frame) and the ballistic data (display frame) and uses data from each as appropriate. In one embodiment, the cursor position is a ballistic position except for when visual spring forces are output, which would cause a conflict in the cursor position and the experienced force. Thus, the cursor position sent to the host is the reference position modified by a constant mapping when the output force is a visual spring force instead of being modified by ballistics. In a different, preferred embodiment, most motion-based output forces are again based on reference data and the cursor position based on ballistic data, but particular forces that cause the conflict such as the visual spring force are determined using the ballistic data.

In other embodiments, enhanced cursor control is provided by outputting assistive forces. In one embodiment, a resistive force dedicated for enhanced cursor control, such as a damping for friction force, is output to slow movement of the manipulandum. The resistive force has a magnitude inversely based on a velocity of the manipulandum in the device workspace to allow the mouse to be slowed down for fine positioning tasks and freed or unencumbered for coarse positioning tasks. In a different embodiment, a detent force is associated with targets in the GUI for guiding the manipulandum to a particular position and thereby guiding said cursor to a corresponding position in the graphical environment. In another embodiment, the detent forces are provided as a field of detents arranged in a predetermined spacing over a predetermined area surrounding the cursor, which are provided when the manipulandum is under a predetermined velocity and thus likely to need the detents for fine positioning of the cursor. In a different embodiment, obstruction forces simulating surfaces are arranged to assist the user to controlling the cursor in fine positioning tasks.

An indexing feature of the present invention allows control over the cursor by the mouse when an offset exists between the position of the mouse in its workspace (local frame) and the position of the cursor on the display screen (display frame). The mouse device is coupled to a host computer that displays graphical objects in a graphical environment on a display screen and includes a mouse moveable in a mouse workspace. The cursor is moved in a screen area based on the movement of said mouse. The mouse is determined whether it is within a predetermined distance to a physical limit of the mouse workspace, the predetermined distance being defined by a region next to said physical limit. A location of the mouse in the region is determined, and the location is used to provide control of movement of the cursor toward the screen edge corresponding to the physical limit. A cursor position is reported to the host computer allowing control of the cursor to the edge of said screen area despite the offset between local and display frames. A force feedback mouse device that provides an indexing function is similar to the method.

In one embodiment of the indexing feature, the distance of penetration of the mouse into the region is sensed, and a resistive force is output on the mouse resisting the movement into the region. For example, the force may be a resistive spring force having a magnitude based on the distance of the mouse past the region border. The penetration distance is used to provide control of movement of the cursor toward a screen limit of the display frame corresponding to the physical limit according to a isometric control paradigm. The speed of the cursor may be based on the distance of the mouse past the region border (e.g. the compression of the simulated spring). In a different embodiment of an indexing feature, a first distance between a current position of the mouse and the closest physical limit of the workspace is determined, and a second distance between a current position of the cursor and the edge to the display screen corresponding to that physical limit is determined. A ratio between the first and second distances is used to determine a scaling for determining cursor position, thus allowing the cursor to be positioned to the edge of said screen area when (or before) the mouse reaches the physical limit to the workspace. In one embodiment, this scaling is performed only when the mouse is within a predetermined region adjacent to a physical limit of the mouse workspace.

An interface device of the present invention providing enhanced cursor control over a cursor includes a user manipulatable physical object contacted by a user and movable in physical space, a sensor that detects movement of the physical object in physical space and an actuator that applies output forces on the physical object. A local microprocessor is preferably included for determining and reporting the cursor position to the host, determining and outputting forces, and determining indexing functions similarly as in the above embodiments.

The methods and apparatus of the present invention advantageously provides enhanced control over a cursor in a graphical environment while not compromising the fidelity or expected feel of force feedback sensations based on motion of the mouse or other user object. This allows a user to perform fine positioning and coarse motion of the cursor as desired and still experience forces as expected based on interactions of the cursor in the graphical environment. In addition, the indexing features of the present invention allow the user to control the cursor even when a large offset exists between the mouse and cursor positions in their respective frames, allows the user to reduce this offset, and substantially reduces the user's undesired experience of any hard, physical stops when the mouse reaches a physical limit.

These and other advantages of the present invention will become apparent to those skilled in the art upon a reading of the following specification of the invention and a study of the several figures of the drawing.

BRIEF DESCRIPTION OF THE DRAWINGS

FIG. 1 is a perspective view of one embodiment of a mouse interface system suitable for use with the present invention;

FIG. 2 is a perspective view of an embodiment of a mechanism suitable for the interface system of FIG. 1;

FIGS. 3a–b are top plan views of the mechanism of FIG. 2;

DETAILED DESCRIPTION OF PREFERRED EMBODIMENTS

Figure 4:
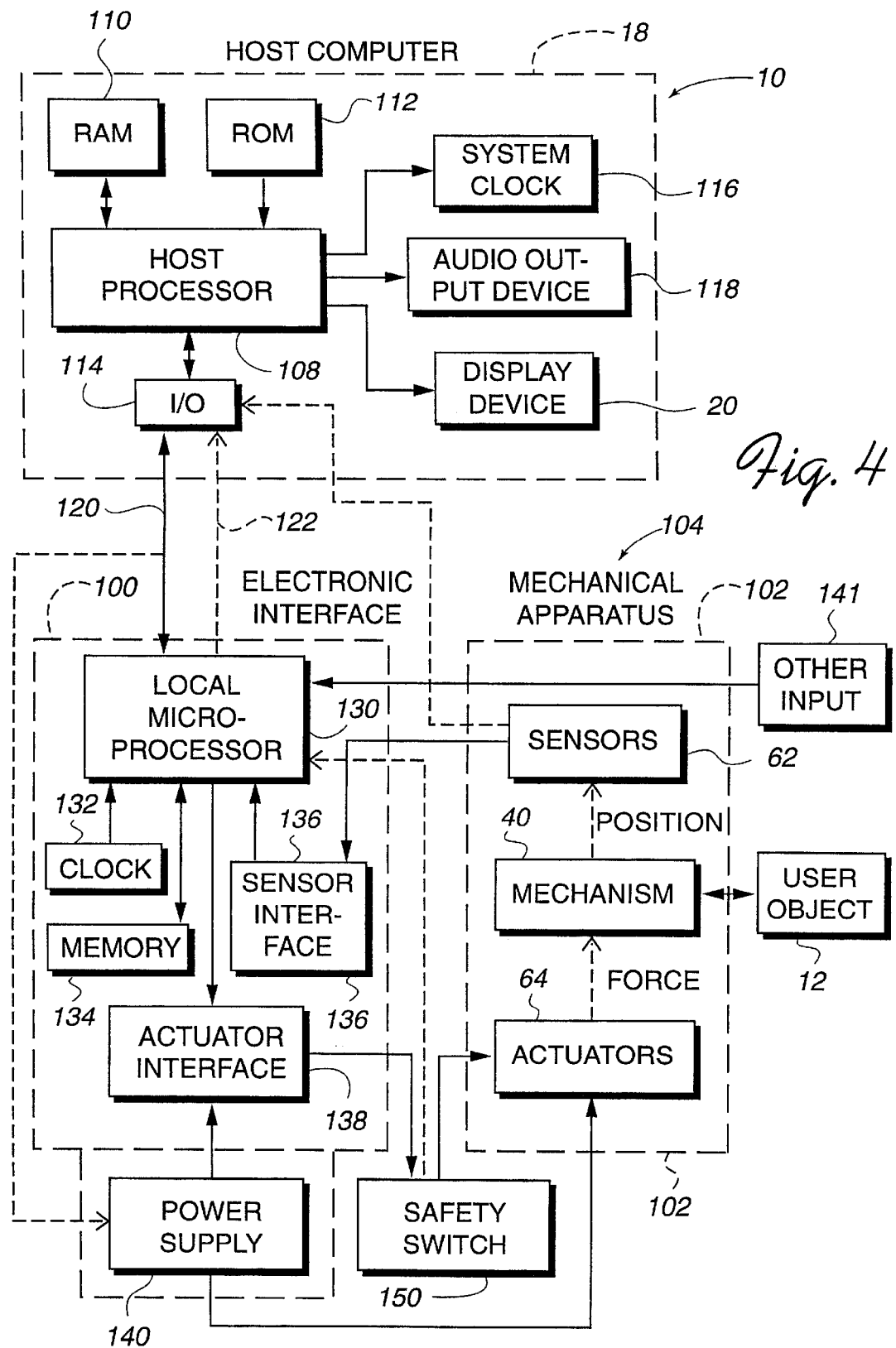
FIG. 4 is a block diagram of the system of FIG. 1 for controlling a force feedback interface device of the present invention.

FIG. 1 is a perspective view of a force feedback mouse interface system 10 of the present invention capable of providing input to a host computer based on the user's manipulation of the mouse and capable of providing force feedback to the user of the mouse system based on events occurring in a program implemented by the host computer. Mouse system 10 includes a mouse or "puck" 12, an interface 14, and a host computer 18. It should be noted that the term "mouse" as used herein, indicates an object 12 generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but may be shaped otherwise in other embodiments.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space; an example of a user's hand is shown as dashed line 16. For example, a user can move mouse 12 to correspondingly move a computer generated graphical object, such as a cursor or other image, in a graphical environment provided by computer 18. The available degrees of freedom in which mouse 12 can be moved are determined from the interface 14, described below. In addition, mouse 12 preferably includes one or more buttons 15 to allow the user to provide additional commands to the computer system.

It will be appreciated that a great number of other types of user manipulable objects ("user objects" or "physical objects") can be used with the method and apparatus of the present invention in place of or in addition to mouse 12. For example, such objects may include a sphere such as a track ball, a puck, a joystick, cubical- or other-shaped hand grips, a receptacle for receiving a finger or a stylus, a flat planar surface like a plastic card having a rubberized, contoured, and/or bumpy surface, or other objects.

Interface 14 interfaces mechanical and electrical input and output between the mouse 12 and host computer 18 implementing the application program, such as a GUI, simulation or game environment. Interface 14 provides multiple degrees of freedom to mouse 12; in the preferred embodiment, two planar degrees of freedom are provided to the mouse, as shown by arrows 22. In other embodiments, greater or fewer degrees of freedom can be provided, as well as rotary degrees of freedom. For many applications, mouse 12 need only be moved in a very small workspace area, shown as dashed line 24 in FIG. 1 as an example.

In a preferred embodiment, the user manipulates mouse 12 in a planar workspace and the position of mouse 12 is translated into a form suitable for interpretation by position sensors of the interface 14. The sensors track the movement of the mouse 12 in planar space and provide suitable electronic signals to an electronic portion of interface 14. The interface 14 provides position information to host computer 18, which the host uses, for example, to display a cursor or other user-controlled graphical object. In addition, host computer 18 and/or interface 14 provide force feedback signals to actuators coupled to interface 14, and the actuators generate forces on members of the mechanical portion of the interface 14 to provide forces on mouse 12 in provided or desired degrees of freedom. The user experiences the forces generated on the mouse 12 as realistic simulations of force sensations such as jolts, springs, textures, "barrier" forces, and the like.

The electronic portion of interface 14 may couple the mechanical portion of the interface to the host computer 18.

The electronic portion is preferably included within the housing 26 of the interface 14 or, alternatively, the electronic portion may be included in host computer 18 or as a separate unit with its own housing. More particularly, interface 14 preferably includes a local microprocessor distinct and separate from any microprocessors in the host computer 18 to control force feedback on mouse 12 independently of the host computer, as well as sensor and actuator interfaces. A suitable embodiment of the electrical portion of interface 14 is described in detail with reference to FIG. 4.

The interface 14 can be coupled to the computer 18 by a bus 17, which communicates signals between interface 14 and computer 18 and also, in the preferred embodiment, provides power to the interface 14 (e.g. when bus 17 includes a USB interface). In other embodiments, signals can be sent between interface 14 and computer 18 by wireless transmission/reception. In preferred embodiments of the present invention, the interface 14 serves as an input/output (I/O) device for the computer 18. The interface 14 can also receive inputs from other input devices or controls that are associated mouse system 10 and can relay those inputs to computer 18. For example, commands sent by the user activating a button 15 on mouse 12 can be relayed to computer 18 by interface 14 to implement a command or cause the computer 18 to output a command to the interface 14.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, home computer system 18 can be a "set top box" which can be used, for example, to provide interactive television functions to users, or a "network-" or "Internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 18 preferably implements a host application program with which a user is interacting via mouse 12 and other peripherals, if appropriate, and which can include force feedback functionality. For example, the host application program can be a simulation, video game, Web page or browser that implements HTML, VRML, or other instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Unix, etc. are also referred to as "application programs." In one preferred embodiment, an application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object. The host application program checks for input signals received from the electronics and sensors of interface 14, and outputs force values and/or commands to cause the output of forces on mouse 12. Suitable software drivers which interface such simulation software with computer input/output (I/O) devices are available from Immersion Human Interface Corporation of San Jose, Calif.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a GUI. Images describing a moving, first person point of view can be displayed, as in a virtual reality game. Or, images describing a third-person perspective of objects, backgrounds, etc. can be displayed. Alternatively, images from a simulation can be displayed. Images may be displayed and/or modified on display device 20 in response to user manipulations of mouse 12.

There are two primary "control paradigms" of operation for mouse system 10: position control and rate control. Position control is the more typical control paradigm for mouse and similar controllers, and refers to a mapping of mouse 12 in which displacement of the mouse in physical space directly dictates displacement of a graphical object. The mapping can have an arbitrary scale factor, but the fundamental relation between mouse displacements and graphical object displacements should be present. Under a position control mapping, the computer object does not move unless the user object is in motion. Position control is a popular mapping for applications such as graphical user interfaces (GUI's) or medical procedure simulations. Position control force feedback roughly corresponds to forces which would be perceived directly by the user, i.e., they are "user-centric" forces.

As shown in FIG. 1, a "display frame" 28 is provided with the display screen 20 for defining the area of movement of a cursor in graphical environment. This frame can also be considered a "host frame", although the interface 14 may reference it as well. In contrast, the mouse 12 has a "local frame" 30 allowed by the workspace in which the mouse 12 is moved. In a position control paradigm, the position (or change in position) of a user-controlled graphical object, such as a cursor, in display frame 30 corresponds to a position (or change in position) of the mouse 12 in the local frame 28.

Rate control is also used as a control paradigm. This refers to a mapping in which the displacement of the mouse 12 along one or more provided degrees of freedom is abstractly mapped to motion of a computer-simulated object under control. There is not a direct physical mapping between physical object (mouse) motion and computer object motion. Thus, most rate control paradigms allow the user object can be held steady at a given position but the controlled computer object is in motion at a commanded or given velocity, in contrast to the position control paradigm that only allows the controlled computer object to be in motion if the user object is in motion.

The mouse interface system 10 is useful for both position control ("isotonic") tasks and rate control ("isometric") tasks. For example, as a traditional mouse, the position of mouse 12 in the workspace 24 can be directly mapped to a position of a cursor on display screen 20 in a position control paradigm. Alternatively, the displacement of mouse 12 in a particular direction against an opposing output force can command rate control tasks in an isometric mode, as described with reference to the indexing feature of FIG. 13. Another implementation that provides both isotonic and isometric functionality for a force feedback controller and which is suitable for the interface device of the present invention is described in U.S. Pat. No. 5,825,308, incorporated by reference herein.

Mouse 12 can be used, for example, to control a computer-generated graphical object such as a cursor displayed in a graphical computer environment, such as a GUI. The user can move the mouse in 2D planar workspace to move the cursor to graphical objects in the GUI or perform other tasks. In other graphical environments, such as a virtual reality video game, a user can be controlling a computer player or vehicle in the virtual environment by manipulating the mouse 12. The computer system tracks the position of the mouse with sensors as the user moves it. The computer system may also provide force feedback commands to the mouse, for example, when the user moves the graphical object against a generated surface such as an edge of a window, a virtual wall, etc. It thus appears and feels to the user that the mouse and the graphical object are contacting real surfaces.

FIG. 2 is a perspective view of one embodiment of mouse system 10 with the cover portion of housing 26 removed, showing the mechanical portion of interface 14 for providing mechanical input and output in accordance with the present invention. The mouse device 10 of FIG. 2 is described in greater detail in U.S. Pat. No. 6,100,874, incorporated by reference herein in its entirety.

Interface 14 includes a mouse or other user manipulatable object 12, a mechanical linkage 40, and a transducer system 41. A base 42 is provided to support the mechanical linkage 40 and transducer system 41 on grounded surface 34. Mechanical linkage 40 provides support for mouse 12 and couples the mouse to a grounded surface 34, such as a tabletop or other support. Linkage 40 is, in the described embodiment, a 5-member (or "5-bar") linkage including a ground member 42, a first base member 44 coupled to ground member 42, a second base member 48 coupled to ground member 42, a link member 46 coupled to base member 44, and an object member 50 coupled to link member 46, base member 48 and to mouse 12. Fewer or greater numbers of members in the linkage can be provided in alternate embodiments.

Ground member 42 of the linkage 40 is a base for the support of the linkage and is coupled to or resting on a ground surface 34. The members of linkage 40 are rotatably coupled to one another through the use of rotatable pivots or bearing assemblies ("bearings") having one or more bearings. Base member 44 is rotatably coupled to ground member 42 by a grounded bearing 52 and can rotate about an axis A. Link member 46 is rotatably coupled to base member 44 by bearing 54 and can rotate about a floating axis B, and base member 48 is rotatably coupled to ground member 42 by bearing 52 and can rotate about axis A. Object member 50 is rotatably coupled to base member 48 by bearing 56 and can rotate about floating axis C, and object member 50 is also rotatably coupled to link member 46 by bearing 58 such that object member 50 and link member 46 may rotate relative to each other about floating axis D. Linkage 40 is formed as a five-member closed-loop chain arranged such that the members can rotate about their respective axes to provide mouse 12 with two degrees of freedom, i.e., mouse 12 can be moved within a planar workspace defined by the x-y plane, which is defined by the x- and y-axes as shown in FIG. 2. Mouse 12 in the preferred embodiment is coupled to object member 50 by a rotary bearing 60 so that the mouse may rotate about floating axis E and allow the user some flexible movement in the planar workspace.

Transducer system 41 is used to sense the position of mouse 12 in its workspace and to generate forces on the mouse 12. Transducer system 41 preferably includes sensors 62 and actuators 64. The sensors 62 collectively sense the movement of the mouse 12 in the provided degrees of freedom and send appropriate signals to the electronic portion of interface 14. Sensor 62a senses movement of link member 48 about axis A, and sensor 62b senses movement of base member 44 about axis A. These sensed positions about axis A allow the determination of the position of mouse 12 using known constants such as the lengths of the members of linkage 40 and using well-known coordinate transformations.

Sensors 62 are, in the described embodiment, grounded optical encoders that sense the intermittent blockage of an emitted beam. A grounded emitter portion 70 emits a beam which is detected across a gap by a grounded detector 72. A moving encoder disk or arc 74 is provided at the end of member 48 which blocks the beam in predetermined spatial increments and allows a processor to determine the position of the arc 74 and thus the member 48 by counting the spatial increments. Also, a velocity of member 48 based on the speed of passing encoder marks can also be determined.

Transducer system 41 also preferably includes actuators 64 to transmit forces to mouse 12 in space, i.e., in two (or more) degrees of freedom of the user object. The housing of a grounded portion of actuator 64b is rigidly coupled to ground member 42 and a moving portion of actuator 64b (preferably a coil) is integrated into the base member 44. The actuator transmits rotational forces to base member 44 about axis A. The housing of the grounded portion of actuator 64a is rigidly coupled to ground member 42 through the grounded housing of actuator 64b, and a moving portion (preferably a wire coil) of actuator 64a is integrated into base member 48. Actuator 64a transmits rotational forces to link member 48 about axis A. The combination of these rotational forces about axis A allows forces to be transmitted to mouse 12 in all directions in the planar workspace provided by linkage 40 through the rotational interaction of the members of linkage 40.

In the preferred embodiment, actuators 64 are electromagnetic voice coil actuators which provide force through the interaction of a current in a magnetic field. The magnetic fields from magnets of the actuators interact with a magnetic field produced from the wire coil when current is flowed in the coil, thereby producing forces on appropriate members. The magnitude or strength of the force is dependent on the magnitude of the current that is applied to the coil, the number of loops in the coil, and the magnetic field strength of the magnets. The direction of the force depends on the direction of the current in the coil. Forces in the x- and y-directions of mouse 10 are thus produced. The operation of voice coil actuators is described in greater detail in U.S. Pat. No. 5,805,140, incorporated by reference herein. In other embodiments, other types of actuators can be used, both active and passive, such as DC motors, pneumatic motors, passive friction brakes, passive fluid-controlled brakes, etc. Voice coil actuators can also be used as sensors to sense the velocity (and thus position and acceleration) of the members 44 and 48 about axis A.

In an alternate embodiment, the mechanism 14 can be used for a 3-D interface device that allows a user to move a user object 12 in three dimensions rather than the 2-D planar workspace disclosed. For example, in one embodiment, the entire mechanism 14 can be made to rotate about a grounded axis, such as axis H extending through the magnet assemblies 88.

As shown in FIG. 3a, a workspace guide opening 76 is provided in ground member 42 to limit the movement of mouse 12 in the x-y plane and thus defines the physical workspace of the mouse 12. Guide opening 76 is a shallow opening in the ground member 42 having sides which block movement of the mouse 12 beyond specified limits. A guide pin 78 is coupled to the bearing 60 at axis E and extends down into the guide opening 76. Pin 78 contacts one or more sides of the opening 76 when the mouse is moved to a limit in a particular direction. As shown, guide opening 76 has relatively small dimensions, allowing the mouse a workspace of approximately 0.9" by 0.9" in the described embodiment. This is typically adequate workspace for the user to move the mouse and control a graphical object such as a cursor on a display screen. In other embodiments, differently-sized guide openings can be provided for differently-sized workspaces, or other types of stops or guides can be used to prevent movement past predetermined limits. The guide opening 76 is shown as square shaped, but it can be rectangular in other embodiments; for example, the dimensions of opening 76 can be made the same aspect ratio as the displayed area of display device 20. FIG. 3a shows guide pin 78 approximately in the center of the guide opening 76.

In FIG. 3b, the mouse 12 (not shown) and axis E have been moved in the x-y plane of the workspace of the mouse. The movement of the mouse has been limited by the guide opening 76, where guide pin 78 has engaged the sidewall of the upper-left corner area of guide opening 76 and stops any further movement in the forward y-direction.

FIG. 4 is a block diagram illustrating the electronic portion of interface 14 and host computer 18 suitable for use with the present invention. Mouse interface system 10 includes a host computer 18, electronic interface 100, mechanical apparatus 102, and mouse or other user object 12. Electronic interface 100, mechanical apparatus 102, and mouse 12 can also collectively be considered a "force feedback interface device" 104 that is coupled to the host computer. A similar system is described in detail in U.S. Pat. No. 5,634,373, which is hereby incorporated by reference herein.

As explained with reference to FIG. 1, computer 18 is preferably a personal computer, workstation, video game console, or other computing or display device. Host computer system 18 commonly includes a host microprocessor 108, random access memory (RAM) 110, read-only memory (ROM) 112, input/output (I/O) electronics 114, a clock 116, a display device 20, and an audio output device 118. Host microprocessor 108 can include a variety of available microprocessors from Intel, AMD, Motorola, or other manufacturers, and can be single microprocessor chip, or multiple primary and/or co-processors. Microprocessor 108 preferably retrieves and stores instructions and other necessary data from RAM 110 and ROM 112 as is well known to those skilled in the art. In the described embodiment, host computer system 18 can receive sensor data or a sensor signal via a bus 120 from sensors of system 10 and other information. Microprocessor 108 can receive data from bus 120 using I/O electronics 114, and can use I/O electronics to control other peripheral devices. Host computer system 18 can also output commands to interface device 104 via bus 120 to cause force feedback for the interface system 10.

Clock 116 is a standard clock crystal or equivalent component used by host computer 18 to provide timing to electrical signals used by host microprocessor 108 and other components of the computer system 18. Clock 116 is accessed by host computer 18 in the control process of the present invention to provide timing information that may be necessary in determining force or position, e.g., calculating a velocity or acceleration from position values.

Display device 20 is described with reference to FIG. 1. Audio output device 118, such as speakers, can be coupled to host microprocessor 108 via amplifiers, filters, and other circuitry well known to those skilled in the art. Host processor 108 outputs signals to speakers 118 to provide sound output to the user when an "audio event" occurs during the implementation of the host application program. Other types of peripherals can also be coupled to host processor 108, such as storage devices (hard disk drive, CD ROM drive, floppy disk drive, etc.), printers, and other input and output devices.

Electronic interface 100 is coupled to host computer system 18 by a bi-directional bus 120. The bi-directional bus sends signals in either direction between host computer system 18 and the interface device 104. Bus 120 can be a serial interface bus providing data according to a serial communication protocol, a parallel bus using a parallel protocol, or other types of buses. An interface port of host computer system 18, such as an RS232 serial interface port, connects bus 120 to host computer system 18. In another embodiment, an additional bus 122 can be included to communicate between host computer system 18 and interface device 13. Bus 122 can be coupled to a second port of the host computer system, such as a "game port", such that two buses 120 and 122 are used simultaneously to provide an increased data bandwidth. One preferred serial interface bus used in the present invention is the Universal Serial Bus (USB). The USB standard provides a relatively high speed serial interface that can provide force feedback signals in the present invention with a high degree of realism. USB can also source power to drive actuators 64 and other devices of the present invention, and can provide timing data that is encoded along with differential data.

Electronic interface 100 includes a local microprocessor 130, local clock 132, local memory 134, sensor interface 136, and actuator interface 138. Interface 100 may also include additional electronic components for communicating via standard protocols on buses 120 and 122.

In various embodiments, electronic interface 100 can be included in mechanical apparatus 102, in host computer 18, or in its own separate housing.

Local microprocessor 130 preferably coupled to bus 120 and may be closely linked to mechanical apparatus 102 to allow quick communication with other components of the interface device. Processor 130 is considered "local" to interface device 104, where "local" herein refers to processor 130 being a separate microprocessor from any processors 108 in host computer 18. "Local" also preferably refers to processor 130 being dedicated to force feedback and sensor I/O of the interface system 10, and being closely coupled to sensors and actuators of the mechanical apparatus 102, such as within the housing of or in a housing coupled closely to apparatus 102. Microprocessor 130 can be provided with software instructions to wait for commands or requests from computer host 18, parse/decode the command or request, and handle/control input and output signals according to the command or request. In addition, processor 130 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 200 include the MC68HC711E9 by Motorola, the PIC16C74 by Microchip, and the 80930 from Intel, for example. Microprocessor 130 can include one microprocessor chip, or multiple processors and/or co-processor chips, and/or digital signal processor (DSP) functionality.

For example, in one host-controlled embodiment that utilizes microprocessor 130, host computer 18 can provide low-level force commands over bus 120, which microprocessor 130 directly transmits to the actuators. In a different local control embodiment, host computer system 18 provides high level supervisory commands to microprocessor 130 over bus 120, and microprocessor 130 manages low level force control loops to sensors and actuators in accordance with the high level commands and independently of the host computer 18. In the local control embodiment, the microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. Force feedback used in graphical environments is described in greater detail in U.S. Pat. Nos. 6,219,032; 5,825,308; and 6,078,308, all of which are incorporated by reference herein.

For example, a rigid surface is generated on computer screen 20 and a computer object (e.g., cursor) controlled by the user collides with the surface. In a preferred embodiment, high-level host commands can be used to provide the various forces associated with the rigid surface.

A local control mode using microprocessor 130 can be helpful in increasing the response time for forces applied to the user object, which is essential in creating realistic and accurate force feedback.

For example, it is preferable that host computer 18 send a "spatial representation" to microprocessor 130, which is data describing the locations of some or all the graphical objects displayed in a GUI or other graphical environment which are associated with forces and the types/characteristics of these graphical objects. The microprocessor can store such a spatial representation in memory 134, and thus will be able to determine interactions between the user object and graphical objects (such as the rigid surface) independently of the host computer. In addition, the microprocessor 130 can be provided with the necessary instructions or data to check sensor readings, determine cursor and target positions, and determine output forces independently of host computer 18. The host can implement program functions (such as displaying images) when appropriate, and synchronization commands can be communicated between processor 130 and host 18 to correlate the microprocessor and host processes. Also, memory 134 can store predetermined force sensations for microprocessor 130 that are to be associated with particular types of graphical objects. Alternatively, the computer 18 can directly send force feedback signals to the interface 14 to generate forces on mouse 12.

Sensor signals used by microprocessor 130 are also reported to host computer system 18, which updates a host application program and outputs force control signals as appropriate. For example, if the user moves mouse 12, the computer system 18 receives cursor position signals indicating this movement and can move a displayed cursor in response. These embodiments are described in greater detail in U.S. Pat. Nos. 5,739,811 and 5,734,373. In an alternate embodiment, no local microprocessor 130 is included in interface system 10, and host computer 18 directly controls and processes all signals to and from the interface 100 and mechanical interface 102.

A local clock 132 can be coupled to the microprocessor 130 to provide timing data, similar to system clock 116 of host computer 18; the timing data might be required, for example, to compute forces output by actuators 64 (e.g., forces dependent on calculated velocities or other time dependent factors). In alternate embodiments using the USB communication interface, timing data for microprocessor 130 can be retrieved from the USB interface.

Local memory 134, such as RAM and/or ROM, is preferably coupled to microprocessor 130 in interface 100 to store instructions for microprocessor 130 and store temporary and other data. Microprocessor 130 may also store calibration parameters in a local memory 134 such as an EEPROM. Memory 134 may also be used to store the state of the force feedback device, including a reference position, current control mode or configuration, etc.

Sensor interface 136 may optionally be included in electronic interface 100 convert sensor signals to signals that can be interpreted by the microprocessor 130 and/or host computer system 18. For example, sensor interface 136 can receive signals from a digital sensor such as an encoder and convert the signals into a digital binary number representing the position of a member or component of mechanical apparatus 14. An analog to digital converter (ADC) in sensor interface 136 can convert a received analog signal to a digital signal for microprocessor 130 and/or host computer 18. Alternately, microprocessor 130 can perform these interface functions without the need for a separate sensor interface 136. Or, sensor signals from the sensors can be provided directly to host computer system 18. Other types of interface circuitry 136 can also be used. For example, an electronic interface is described in U.S. Pat. No. 5,576,727, which is hereby incorporated by reference herein.

Actuator interface 138 can be optionally connected between the actuators 64 and microprocessor 130. Interface 138 converts signals from microprocessor 130 into signals appropriate to drive the actuators. Interface 138 can include power amplifiers, switches, digital to analog controllers (DACs), and other components. Such interfaces are well known to those skilled in the art. In alternate embodiments, interface 138 circuitry can be provided within microprocessor 130 or in the actuators.

In the described embodiment, power is supplied to the actuators 64 and any other components (as required) by the USB. Alternatively, power from the USB can be stored and regulated by interface 100 or apparatus 102 and thus used when needed to drive actuators 64. Alternatively, a power supply 140 can optionally be coupled to actuator interface 138 and/or actuators 64 to provide electrical power.

Mechanical apparatus 102 is coupled to electronic interface 100 preferably includes sensors 62, actuators 64, and linkage 40. Sensors 62 sense the position, motion, and/or other characteristics of mouse 12 along one or more degrees of freedom and provide signals to microprocessor 130 including information representative of those characteristics. Typically, a sensor 62 is provided for each degree of freedom along which mouse 12 can be moved, or, a single compound sensor can be used for multiple degrees of freedom. Example of sensors suitable for embodiments described herein are rotary or linear optical encoders, potentiometers, non-contact sensors (e.g., Hall effect magnetic sensors, optical sensors, lateral effect photo diodes), velocity sensors (e.g., tachometers), or acceleration sensors (e.g., accelerometers). Furthermore, either relative or absolute sensors can be employed.

Actuators 64 transmit forces to mouse 12 in one or more directions along one or more degrees of freedom in response to signals output by microprocessor 130 and/or host computer 18, i.e., they are "computer controlled." Typically, an actuator 64 is provided for each degree of freedom along which forces are desired to be transmitted. Actuators 64 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can also be used for actuators 64, such as magnetic particle brakes, friction brakes, pneumatic/hydraulic passive actuators, or passive damper elements and generate a damping resistance or friction in a degree of motion. In some embodiments, all or some of sensors 62 and actuators 64 can be included together as a sensor/actuator pair transducer.

Mechanism 40 is preferably the five-member linkage 40 described above, but can also be one of several types of mechanisms. For example, mechanisms disclosed in U.S. Pat. Nos. 5,731,804; 5,767,839; 5,721,566; 5,805,140; 5,691,898; 6,028,593; 6,024,576; and 5,828,197, all incorporated by reference herein, can be included. Mouse 12 can alternatively be a puck, joystick, or other device or article coupled to linkage 40, as described above.

Other input devices 141 can optionally be included in system 10 and send input signals to microprocessor 130 and/or host computer 18. Such input devices can include buttons, such as buttons 15 on mouse 12, used to supplement the input from the user to a GUI, game, simulation, etc. Also, dials, switches, sensors, voice recognition hardware (with software implemented by host 18), or other input mechanisms can be used.

Safety or "deadman" switch 150 is preferably included in interface device to provide a mechanism to allow a user to override and deactivate actuators 64, or require a user to activate actuators 64, for safety reasons. Safety switch 150 is coupled to actuators 64 such that the user must continually activate or close safety switch 150 during manipulation of mouse 12 to activate the actuators 64. If, at any time, the safety switch is deactivated (opened), power is cut to actuators 64 (or the actuators are otherwise deactivated) as long as the safety switch is opened. Safety switch 150 can be a mechanical or optical switch located on mouse 12 or on a convenient surface of a housing 26, an electrostatic contact switch to sense contact of the user, or a hand-weight safety switch as described in U.S. Pat. No. 5,691,898, incorporated by reference herein. The safety switch can be integrated with an indexing feature as well, as described in U.S. Pat. No. 5,825,308, incorporated by reference herein. The state of the safety switch can be sent to the microprocessor 130 and/or to host 18.

In some embodiments of interface system 10, multiple mechanical apparatuses 102 and/or electronic interfaces 100 can be coupled to a single host computer system 18 through bus 120 (or multiple buses 120) so that multiple users can simultaneously interface with the host application program (in a multi-player game or simulation, for example). In addition, multiple players can interact in the host application program with multiple interface systems 10 using networked host computers 18, as is well known to those skilled in the art. Also, the interface device 104 can be coupled to multiple host computers; for example, a local host computer can display images based on data received from a remote host computer coupled to the local host through a network.

Enhanced Cursor Control and Force Feedback One aspect of the present invention is concerned with mouse system 10 allowing an enhanced degree of control over a cursor for a user, as well as allowing high-fidelity force feedback that is not compromised by the control allowed over the cursor. The enhanced degree of cursor control includes fine positioning of the cursor for target acquiring and other tasks, as well as coarse positioning of the cursor that is unencumbered and uninhibitied by the fine positioning.

Another aspect of the present invention is to allow control over the cursor without limits to physical movement of the mouse (or other object) to become intrusive to the user, i.e., the device incorporates an "indexing" feature that corresponds to the case in a non-force-feedback mouse of the user repositioning the mouse in its workspace to reduce the offset between the mouse frame and the host computer frame. There are several different embodiments described herein that include these features. Although the term "mouse" is used in the following embodiments, it is intended that other types of interface devices and user object may also be used with the present invention. In addition, the various embodiments presented below are described for use with the preferred local microprocessor 130 (or other dedicated processing circuitry on the interface device 104); however, a host computer 18 can implement the embodiments of the present invention (with any appropriate modifications) if no local microprocessor is present in a particular hardware embodiment. Alternatively, the host computer can implement some functions (such as ballistics calculations and indexing calculations) while the microprocessor implements other functions. It is assumed in the methods below that host computer 18 is displaying a graphical environment such as a GUI, game, simulation, etc. on display device 20.

The methods described below may be implemented with program instructions or code stored on or transferred through a computer readable medium. Such a computer readable medium may be digital memory chips or other memory devices; magnetic media such as hard disk, floppy disk, or tape; or other media such as CD-ROM, DVD, PCMCIA cards, etc. The computer readable medium may be included in the interface device 104, in host computer 18, or in both. The program instructions may also be transmitted through a channel to interface device 14 from a different source.

Figure 5:
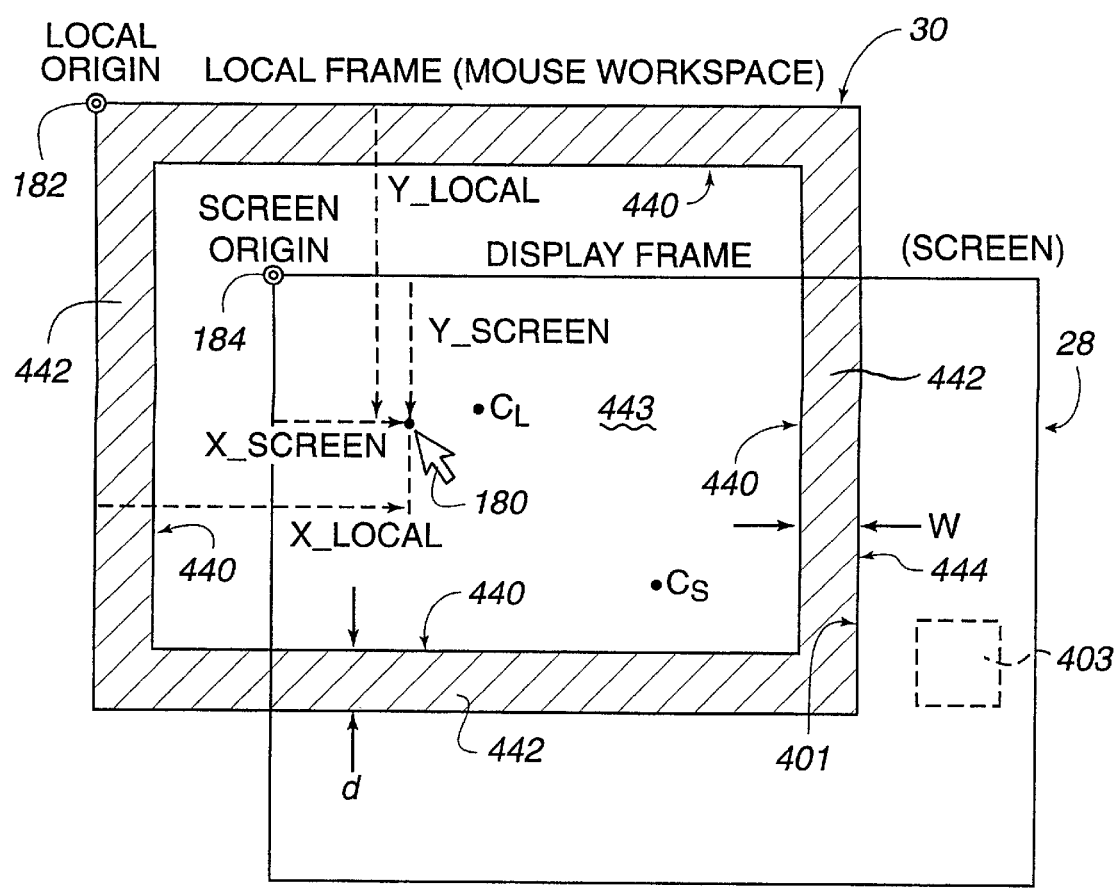
FIG. 5 is a diagrammatic illustration of the local frame and host frame referenced in the present invention.

FIG. 5 is a diagrammatic illustration of the local frame 30 and display frame 28 and their relationship. The local frame 30 is provided in the available workspace in which the mouse or other user object may be moved. In the embodiment described with reference to FIG. 2, for example, the dimensions of the local frame 30 are defined by guide opening 76 in the base 42, which may be approximately 1"×1". Physical limits to the local frame 30 are provided by guide pin 78 physically impacting a wall of opening 76. The mouse workspace may be defined and limited by other mechanisms or structures in other embodiments.

Display frame 28 is shown as a rectangle overlapping the local frame 30. Display frame 28 is the visible, displayed area on display device 20, such as the displayed portion of a video screen, on which a user controlled graphical object, such as cursor 180, may be moved. In FIG. 5, the display frame 28 is shown as the same size as local frame 30 to emphasize certain concepts in the present invention. However, in actuality, the display frame 28 is typically larger in actual size than the local frame; for example, a computer monitor may have a screen of 15"×11" compared to the local frame dimensions 1"×1". Thus, movement in local frame 30 is scaled up to allow movement across the entire area of display frame 28.

Local frame 30 has a local origin 182 from which x and y coordinates of the mouse device in its workspace are referenced. Cursor 180 is shown in FIG. 5 to represent the position of both the cursor 180 displayed in display frame 28 as well as the current position of the mouse 12 in the local frame 30 (e.g., the position of axis E and guide pin 78 in the embodiment of FIG. 2), where the tip of the cursor indicates the precise position. The guide pin 78 (shown as the tip of cursor 180) thus has a position of (X_local, Y_local) in the example of FIG. 5. Likewise, display frame 28 has a screen origin 184 from which x and y coordinates of the cursor 180 displayed on the screen 20 are referenced. The cursor 180 thus has a position of (X_screen, Y_screen) in the example of FIG. 5.

In FIG. 5, the display frame 28 is shown offset from local frame 30. This has implications for the indexing feature of the present invention, which is described in greater detail below.

Figure 6:
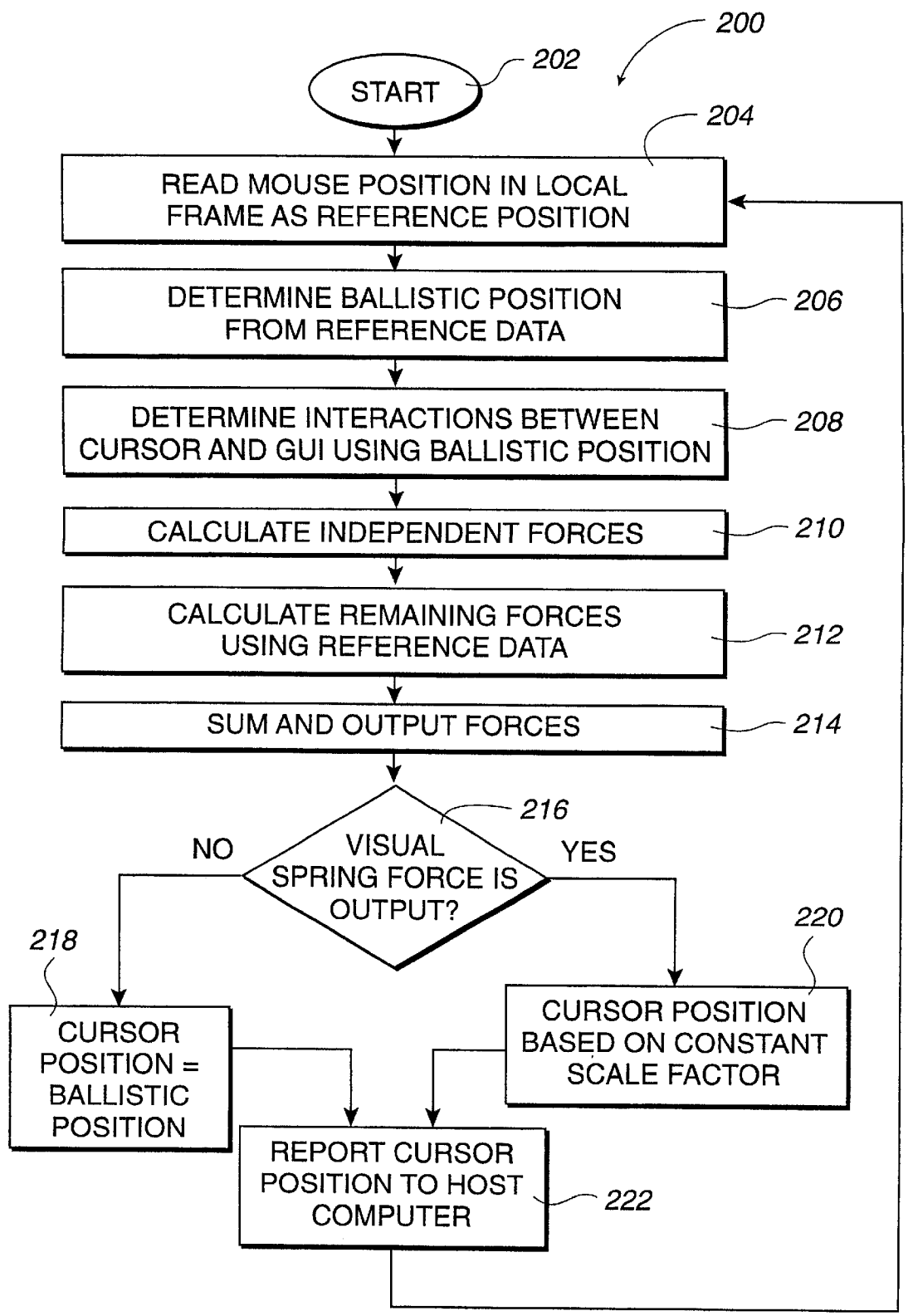
FIG. 6 is a flow diagram illustrating a first embodiment of a method of the present invention for providing enhanced cursor control without compromising force feedback.

FIG. 6 is a flow diagram illustrating a first method 200 of the present invention for implementing enhanced cursor control and realistic force feedback in mouse system 10. In method 200, ballistics are provided to allow fine positioning and coarse motion of the cursor, but reference data is used for determination of position-based forces to provide more realistic force feedback. In the preferred embodiment, the local microprocessor 130 determines the ballistic positions of the cursor, and thus allows the force sensations to be calculated based on reference data.

The method begins at 202. In step 204, the mouse position in the local frame 30 (i.e., mouse workspace) is read by the local microprocessor 130 and is considered the "reference position." For example, the position can be described as x and y coordinates referenced to workspace origin 182. This position is preferably stored in a storage area such as local memory 134 and is kept available for retrieval by the microprocessor at a later time.

In step 206, a ballistic position is determined from reference data. "Reference data", as referred to herein, is data describing the position and/or motion of the mouse in local frame 30. For example, the reference position obtained in step 204 is reference data, and the velocity and acceleration of the mouse in local frame 30 is also reference data. In the described embodiment, the ballistic position is determined using standard ballistic algorithms and methods based on the velocity of the mouse. For example, the current velocity of the mouse in the local frame 30 can be determined by examining stored positions of the mouse over time read by the sensors of the interface device, or by examining timing signals or pulses from sensors, or from differentiating an analog signal, etc. Timing data can be obtained, for example, using local clock 132. One preferred embodiment uses a haptic accelerator on the interface device 104 to determine velocity and/or acceleration of the mouse 12 in its local frame 30 and to input such reference data to the local microprocessor 130, as disclosed in copending patent application Ser. No. 08/804,535, incorporated by reference herein.

Once the velocity of the mouse is known, the local microprocessor can use a ballistics algorithm to determine how to map the position of the cursor to the mouse. A "ballistic scale factor" (BSF) can be determined based on the mouse velocity, where the BSF is the ratio between movement of mouse in its workspace and movement of the cursor on the screen. The BSF is determined such that low mouse velocities create small cursor motions (lower value BSF), and large mouse velocities create large, fast cursor motions (higher value BSF). The BSF can be determined based on a continuous function to determine the precise scaling, or a simpler discrete function can be used in which one or more velocity thresholds are checked to determine the value of the BSF. A change in position of the cursor is then determined as the BSF multiplied by the change in reference position (as determined using values from step 206). The ballistic position is preferably calculated as the old cursor position (the position of the cursor in display frame 28 in the last iteration of method 200) plus the change in position of the cursor just determined. Thus, if the mouse is traveling slowly, then the ballistic position is scaled down or not scaled at all since the user probably is performing fine positioning of the cursor and would like to move the cursor in small increments. If the velocity is large, the ballistic position is scaled higher since the user probably is performing coarse movement to get the cursor across the screen quickly. Such ballistics scaling is well known to those skilled in the art. One or more ballistic positions can be referred to as "ballistic data", and the ballistic positions are preferably stored by the microprocessor in local memory as the display frame data. Thus, the microprocessor keeps track of both local frame data (reference data) and display frame data (ballistic data).

Alternatively, other methods can be used besides ballistics to vary the scaling or the mapping of the cursor position to allow fine positioning and coarse motion of the cursor. For example, a predictive type of scaling of the present invention can be used, which is more "friendly" to force feedback implementations than the standard ballistics of the prior art. Such predictive scaling only implements a fine-positioning scaling that is different from a coarse-movement scaling when it is deemed necessary for greater control over the cursor. That is, other criteria besides mouse velocity are used to determine when to alter the scaling of the cursor position from the mouse position. For example, the local microprocessor can examine positions of the mouse (or the cursor) over a predetermined period of time to see if a fine positioning mode is entered. The microprocessor checks whether the cursor has moved completely within a small region of predefined size for longer than a predetermined period of time. The region can be defined by a radius or rectangular area surrounding the cursor; for example, a region having a radius of (fraction of screen size) can be used. The predetermined period of time is some time period long enough to indicate that the user is attempting to acquire a target or perform some other fine positioning task and may be having some difficulty; for example, 3 seconds can be used, or the time may depend on the particular task. In addition, the cursor should be in motion, since if the cursor is still, then the user may simply have taken his or her hand off the mouse, and fine positioning mode should not be entered.

If such conditions apply, then it is assumed/predicted that the user needs the assistance of fine positioning mode to perform the desired task, and the cursor position is set to an adjusted or scaled reference position that has been scaled for fine positioning. For example, the cursor position can be scaled to ¼ the mouse position so that 4 times the mouse motion is required to achieve an equivalent cursor motion. This allows longer mouse movements to move the cursor in shorter increments and greatly assists fine positioning of the cursor. Alternatively, a ballistic algorithm can be employed in step 364 which makes cursor motion based on the velocity of the mouse. Presumably the user is moving the mouse slowly so that the cursor motion is scaled down according to the ballistics algorithm. If the conditions do not apply, the cursor position can be scaled according to a constant coarse mapping, since the cursor was not deemed to have motion sufficient to change the scaling of the cursor for fine positioning.

In addition, the microprocessor can check for conditions to exit the fine positioning mode of the cursor. For example, the user may press button 15 on mouse 12 (or other input devices) to manually command the mouse to exit fine positioning mode. Or, if the cursor is outside the small predefined region (which does not move with the cursor or mouse once fine positioning mode is entered) then fine positioning mode is exited. Or, if the mouse has remained still and unmoving for a minimum predetermined period of time in the region, fine positioning mode can be exited. Thus, other conditions besides mouse velocity determine when different scaling is applied to the cursor position. This method is useful for force feedback devices because it restricts the variable scaling of cursor position to only cases when the cursor is moving within a very small region and is close to converging upon a target. Because only small motions are involved, the dichotomy between force feedback sensations and the visual motion is not as noticeable to the user. Nevertheless, the force feedback is still preferably modified to minimize any distortion, as described below.

In step 208, the local microprocessor determines interactions between the cursor and the GUI (or other graphical environment, such as a 3-D environment) using the cursor position. The cursor 180 displayed by the host may have encountered or contacted a graphical object or region in the GUI that is associated with a force sensation, so that the force sensation should be output on the mouse. For example, the user may have moved the cursor onto an icon and held down a button 15 on the mouse to drag the icon, which might cause a damping or inertia force to be output when the icon is dragged. Or, the cursor may have been moved over a window border which causes a spring or detent force to be output on the mouse to indicate the location of the border. A different situation in which a force may be output is when an event has taken place in the GUI or other graphical environment which causes a force sensation on the mouse. For example, a sound may be output indicating a mail message has been received, which in turn causes an attractive force on the mouse toward a mail program icon. In some cases, multiple force sensations are output that are overlaid on each other. Many different force sensations and associated cursor interactions and events in a graphical environment are described in greater detail in U.S. Pat. No. 6,219,032, which is incorporated by reference herein. In the preferred embodiment, the local microprocessor 130 is commanded with high level host commands from the host computer 18 to implement one or more local processes that locally check mouse positions and other conditions and output forces when particular interactions or events occur in the graphical environment. For example, as explained above, the local microprocessor can previously be sent a layout of graphical objects in the GUI from the host computer to allow the microprocessor to check for collisions or interactions. Alternatively, the host computer can check these collisions and can send a host command to cause the local processor to immediately output a force when the host computer determines that such a force is appropriate.

It is important to note that the interaction of the cursor with other objects in the display frame graphical environment is generally determined based on the ballistic data from step 206. That is, the cursor position in the graphical environment has been scaled according to mouse velocity and thus may be different than the position of the mouse in the local frame 30. When the local microprocessor determines when interactions of the cursor and graphical objects occur in step 208 (as is preferred), the local microprocessor thus uses the cursor position in the display frame 28 to determine the location of the cursor and any interactions of the cursor in the display frame.

The process continues to step 210, where independent forces are calculated. "Independent forces", as referred to herein, are those forces which are not based on position or motion of the mouse or cursor and thus require neither reference data nor ballistic data to be calculated or generated. For example, time-based or periodic forces, such as a vibration or a jolt, are simply output on the user object at predetermined and/or repeating time intervals and durations, in specified directions, at a specified starting time, and at predetermined magnitudes. To calculate these forces, in contrast with the damping and inertia forces described above, neither the position, velocity, or acceleration of the mouse is required. Thus, these forces can be calculated normally with no need to retrieve reference data or ballistic data.

In step 212, remaining forces are calculated using the reference data. The remaining forces are forces based on a position, velocity, and/or acceleration of the mouse 12. For example, the calculation of a damping force is generally performed using the relation F=Bv, where v is the velocity of the object, B is a damping constant, and F is the resulting damping force. Here, v is preferably based on the velocity of the mouse, so the reference data is used to determine v. Similarly, an inertia force uses acceleration in its calculation, which is based on the reference data in step 214. Likewise, a spring force is typically modelled using F=kx, where x is the displacement of the object and k is a spring constant. The displacement x is of the mouse and is thus provided using the reference data. Also, a friction force can be modelled as F=f*(v/|v|), where f is a friction constant, v is the displacement of the object, provided as reference data, and v/|v| is used to indicate the opposite direction to the velocity of the mouse (since friction opposes motion). Friction forces can be determined in other ways as well.

The use of reference data to calculate such position/motion based forces is one of the features of the present invention. To effectively reconcile the use of ballistic data for cursor positioning with the output of force feedback, the present invention uses reference data in the calculation of forces while providing ballistic data to the host computer to control the position of the cursor on the screen. This allows forces to be realistically based on the actual position of the mouse in its local frame, yet also allows the cursor to based on ballistic data to allow fine positioning and coarse movement of the cursor in the display frame. If both the cursor and the forces were based on reference data, then the advantage of more control over cursor motion gained by the use of ballistic data would be lost. Thus, the present invention advantageously provides ballistic cursor positioning while providing forces based on reference data.

The local microprocessor 130 allows this use of two sets of data to be easily implemented, since the microprocessor can keep track of the reference local frame 30 and the ballistic display frame 28 separately and can choose data from each set as needed. Thus, the microprocessor can select ballistic data when determining the location of the cursor in relation to other graphical objects in the GUI, can select reference data when calculating forces, and can select ballistic data to report to the host computer (described below). The use of local microprocessor 130 for local force generation allows this implementation.

For example, a texture force can make use of both frames of data. In one example, a texture can be a pulsating force based on the position of the user object, as if dragging the user object over bumps or a grating having a particular spacing. One way to implement a texture force sensation is to output a damping force that is modulated based on mouse position, i.e., the damping is turned on and off in sequence to simulate bumps at a given spatial frequency. Using the two stored frames of data, the damping resistance can be generated using the reference data since damping depends on the velocity of mouse motion, and the spatial modulation of the damping force over the textured region can be based on ballistics data since the position of the cursor on the screen dictates when a bump would be felt.

Another solution of the present invention is to use the ballistic data to both position the cursor and to generate all forces. This is a simpler solution in that, once ballistic data is determined from the reference data, the reference data is no longer needed and the ballistic data can be used for all purposes. However, such a solution is not the preferred embodiment. This is because, while the ballistic data would allow fine positioning and coarse motion of the cursor, generation of many types of force sensations with ballistic data would distort or diminish the realism of those force sensations. For example, damping force sensations are typically based on velocity, such as F=Bv. Damping is often used to simulate the viscosity of a material, such as the feel of moving through a liquid. If the ballistic velocity of the cursor is used for v, then the viscosity of a liquid would vary depending on whether the mouse is moved slow or fast as governed by the ballistics algorithm. The ballistic velocity is a scaled velocity, different from the actual velocity of the mouse, that would cause a much different magnitude of damping than the user expects to feel by moving the mouse. A similar situation occurs for an inertia force that is based on the acceleration of an object. If the ballistic data is used to calculate acceleration, a different inertia will be felt than the inertia that the user expects by moving the mouse. The inertia force would feel as if the moving object were heavier when it was moved faster, and lighter when moved slower, which is typically undesired. Thus, using reference data for the determination of such forces as in method 200 provides more realistic forces for the user since the reference data describes actual position/motion of the mouse in local frame 30. The force designer may not want springs to change their perceived stiffness, dampers to change their perceived viscosity, and inertias to change their perceived mass as the mapping shifts using a ballistic algorithm, such that using the ballistic data in force determination is undesired.

In step 214 the forces determined in steps 210 and 212 (as well as any other forces determined for other reasons) are summed and output in step 214. This step may be performed at any time after step 212, or concurrently with remaining steps 216–222. The total force is output by the interface device on the mouse grasped by the user. Actuators 64 are preferably controlled by the local microprocessor 130 to output this force. The output force may also have a specified duration, direction, frequency, and other parameters to which the local microprocessor conforms the output force. The local microprocessor knows these parameters by retrieving them as standard or stored parameters, or may receive new parameters directly from the host computer 18.

In next step 216, the process checks whether a visual spring force was calculated in step 212 (or determined to be required in step 208). A visual spring force is special in that, when reference data is used to determine forces and ballistic data is used to position the cursor on the screen, an undesired dichotomy between the displayed spring and the feel of the spring results. A "visual spring" force is to be distinguished from a "clipped spring" force. The visual spring allows the user to see the cursor moving on the screen following the expansion or contraction of the spring, and feel the spring force as the spring is expanded or contracted. The clipped spring allows the user to feel the spring force as the mouse is moved, but does not cause the cursor to move on the screen. Clipping is described in greater detail below. In step 216, other types of forces can also be checked which, similar to the visual spring force, cause a dichotomy between the visual and haptic experience of the user.

If the force sensation is not a visual spring force, then in step 218 the cursor position is set equal to the ballistic position determined in step 206 above. This allows the fine positioning and coarse movement of the cursor as described above. Step 222 is then implemented, in which the cursor position determined from the above steps is reported to the host computer 18, as detailed below.

If the force sensation is a visual spring force in step 216, then the process continues to step 220, where the cursor position is based on a constant scale factor. Preferably, the scale factor used is the ballistic scale factor that was last in effect when the spring force was first applied. That is, while the visual spring force is in effect, the scaling of the reference data is held constant to the scaling that was performed just before the spring force was first output.

Figure 7A:
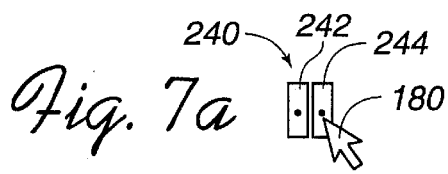
FIGS. 7a–7f are diagrammatic illustrations of the dichotomy between a display frame and a local frame when outputting a visual spring force.
Figure 7B:

FIGS. 7a–7f demonstrate the need to provide a constant scaling during the output of a visual spring force. These Figures illustrate the situation of a visual spring being determined using reference data while the cursor is displayed using ballistic data. FIG. 7a shows display screen 20 (display frame 28) of host computer 18 displaying a graphical object 240 for simulating a spring force. Object 240 includes a fixed portion 242 and a moveable portion 244, where a simulated spring between portions 242 and 244 is shown fully contracted. The user has moved cursor 180 onto moveable portion 244 and has held down the button 15 on the mouse. FIG. 7b shows the equivalent positions to object 240 in the local frame 30. Starting point 246 is at a corresponding position in the mouse workspace to the fixed portion 242 of the graphical object 240 on screen 20. The position of the mouse 12 itself is indicated by a circle or point, which can represent, for example, axis E or the guide pin 78 of the embodiment of FIG. 2. Mouse 12 can be positioned to the right of starting point 246 when the spring is fully contracted, as shown; alternatively, the mouse 12 can be positioned on the starting point 246.

Figure 7C:
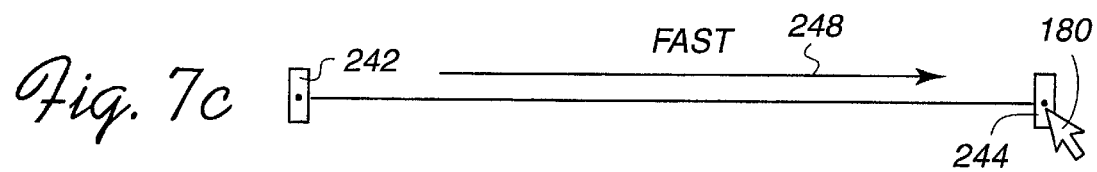
Figure 7D:
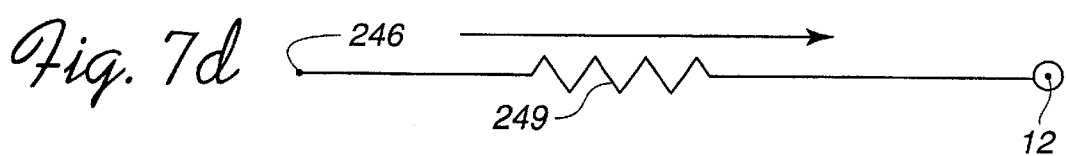

FIG. 7c shows display screen 20 displaying object 240 after the spring has been stretched by the user. As indicated by arrow 248, the user has moved cursor 180 quickly to the right. Since ballistic data is used to display the cursor on the screen, the cursor has moved a large distance to the right due to the fast motion of the mouse. FIG. 7d shows an equivalent position of the mouse 12 in the local frame. The user feels a spring force pulling the mouse 12 toward the starting point, represented by spring 249, where the spring force magnitude is based on the distance moved in the local frame 30. The mouse, of course, has not been moved the same actual distance in the local frame 30 as the cursor has moved on the screen 20 since the cursor motion has been scaled higher than the mouse motion.

Figure 7E:
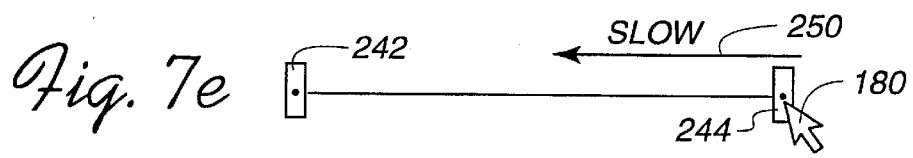
Figure 7F:
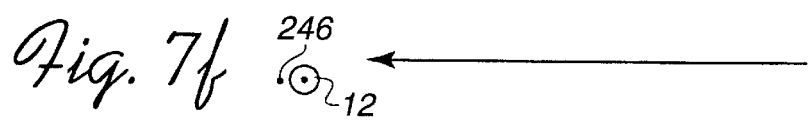

FIG. 7e shows display screen 20 displaying object 240 after the user has moved the mouse 12 back toward the starting position 246 in the opposite direction to the motion of FIGS. 7c and 7d. In FIG. 7e, the mouse is moved slowly by the user, as shown by arrow 250. Thus, the cursor 180 does not move as far due to the ballistic algorithm scaling down the cursor movement to allow fine positioning of the cursor. However, as shown in FIG. 7f, the mouse has been moved all the way back to the starting point 246. Thus, no spring force is output on the mouse 12 because the displacement of the mouse from the starting point is zero. However, when the user looks at the screen 20, the user expects to feel a spring force due to the cursor 180 still being some distance from the fixed portion 242 of the object 240. This dichotomy can be very disconcerting for the user.

The present invention solves this dichotomy, as explained above, by fixing the mapping between the mouse and the cursor during the output of a visual spring force sensation, i.e., using a constant scale factor while the spring is in effect. Thus, as the cursor 180 is moved quickly to the right away from fixed portion 242, the scale factor that was used just prior to selecting the object 240 is used and the cursor moves an appropriate distance on the screen. Likewise, as the cursor is moved slowly back toward the fixed portion 242, the same scale factor is used, resulting in the cursor moving the same distance on the screen. In effect, the ballistics data is ignored during the output of the spring sensation. The force sensation and the visual motion of the cursor are thus coordinated and the dichotomy is eliminated.

In an alternate embodiment, the cursor can be displayed directly according to the reference data (or according to a standard scale factor) rather than according to the last scale factor determined from the ballistics algorithm before the spring sensation was initiated.

Referring back to FIG. 6, after step 220, the process continues to step 222, in which the cursor position determined from the above steps is sent to the host computer 18. The "cursor position" is the position which the local microprocessor has determined will dictate the position of the cursor 180 as it is displayed by the host computer on the display device 20 in the display frame 28. The host computer receives the cursor position and controls the display of the cursor at the appropriate location on the display device 20. Thus, the host computer simply displays the cursor as if receiving input data directly from a peripheral device, and preferably remains ignorant of any processing performed on the reference data and cursor position by the local processor from ballistic, indexing, or other processes. This greatly reduces the processing burden on the host computer, since the microprocessor performs the ballistics calculations and/or the modifying of the scale factor in step 220 and allows the host to simply display the cursor at whatever position is reported to it. The process 200 then returns to step 204 to read another mouse position.

Although not described in FIG. 6, the method 200 may also include any of the indexing features described in the present invention. In fact, such an indexing feature is preferred since method 200 makes use of ballistics, which tend to cause offsets in the local and display frames as described below. Indexing is described in greater detail with reference to FIG. 9. The indexing described there can be adapted for method 200, by for example, replacing step 206 with steps 406–416 and adding steps like 424 and 428 to determine indexing forces if applicable. The embodiment of FIG. 11 can also be adapted for method 200.

In addition to modifying the reference data using ballistics, indexing, or the scale factor used in step 220 before sending the cursor position to the host, the local microprocessor can also modify the cursor position according to other force feedback features which may be implemented in the force feedback mouse system 10. For example, "clipping" can be used in some situations to purposely report a cursor position that does not correspond to the mouse position in the local frame 30. Clipping is typically used to provide an illusion to the user that a hard surface is being encountered with the cursor. For example, when the cursor 180 is moved against a wall surface, an obstruction force having a large enough magnitude force to physically stop the user's motion usually cannot be output due to actuator limitations. Thus, to create the illusion of a hard surface, the user is allowed to move the mouse into the wall against the obstruction force, but the cursor remains displayed against the surface of the wall as if it is impenetrable. Since the user's experience depends heavily on the visual motion of the cursor, an illusion of an impenetrable wall is maintained. To perform this illusion, the reference data from the mouse 12 is "clipped", i.e., modified in that the cursor position against the wall is reported to the host by the local microprocessor rather than the actual position of the mouse through the wall. Clipping may also be performed for isometric forces in which a user moves the mouse to control a rate control function of a GUI and the cursor remains in a constant position. Clipping can be performed in or before step 222 if appropriate to modify the cursor position reported to the host computer. Clipping is described in greater detail in U.S. Pat. Nos. 6,028,593 and 5,825,308, incorporated by reference herein.

Another force feedback feature that can be used to modify the cursor position reported to the host computer is "disturbance filtering." Filtering allows the local microprocessor to filter oscillations and other disturbances out of position data before reporting it to the host computer. This reduces or eliminates force-feedback-induced disturbances in cursor position that occur as a result of certain force sensations, such as vibrations. Thus, the local microprocessor can modify the cursor position to filter out such disturbances and report the filtered cursor position to the host computer. Disturbance filtering is described in greater detail in U.S. Pat. No. 6,020,876, incorporated by reference herein.

In addition, many other steps may also be involved in the determination and output of forces and the reporting of data to the host which are not necessary to the present invention and are thus not detailed herein.

Figure 8:
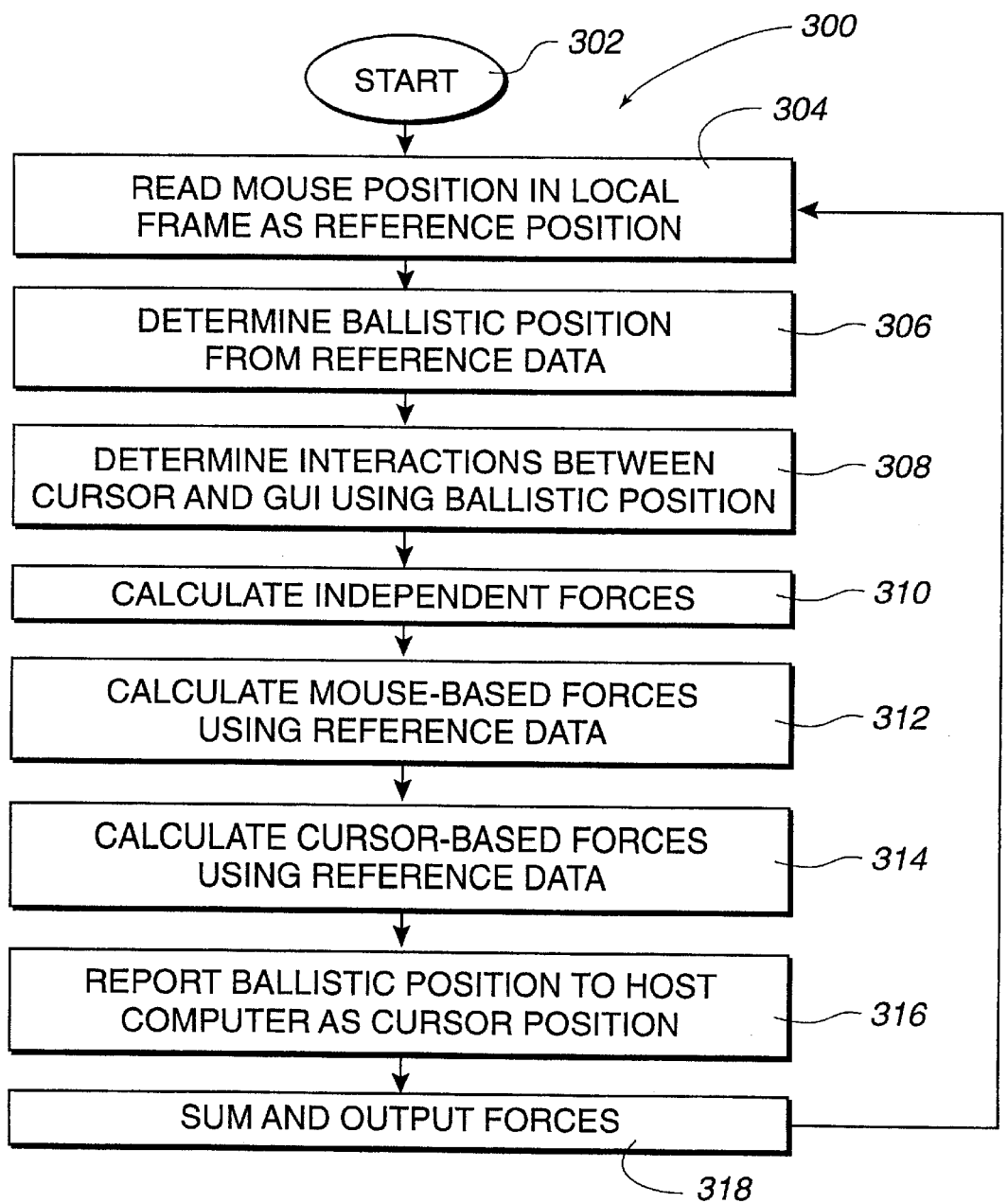
FIG. 8 is a flow diagram illustrating a second embodiment of a method of the present invention for providing enhanced cursor control without compromising force feedback.

FIG. 8 is a flow diagram illustrating a second embodiment 300 of the present invention for implementing enhanced cursor control and realistic force feedback in mouse device 10. In method 300, ballistics are provided to allow fine positioning and coarse motion of the cursor, and reference data or ballistic data is used for force determination to provide more realistic force feedback.

The method begins at 302. In step 304, the mouse position in the local frame 30 is read by the local microprocessor 130 and is the reference position. This position is preferably stored in a storage area such as local memory 134 and is kept available for retrieval by the microprocessor at a later time. In step 306, a ballistic position is determined from reference data. This is performed similarly to step 206 described with reference to FIG. 6.

In step 308, the local microprocessor determines interactions between the cursor and the GUI (or other graphical environment) using the ballistic position. This step is similar to step 208 described above with reference to FIG. 6. The microprocessor also may determine or check for events that cause force sensations. In next step 310, independent forces are calculated, which, as described above, are those forces which are not based on position or motion of the mouse or cursor and thus require neither reference data nor ballistic data to be calculated or generated.

In step 312, mouse based forces are calculated using the reference data. "Mouse based forces" are those force sensations designated to be based on reference data in method 300 (and 400), i.e., based on position or motion of the mouse rather than on the cursor. In the preferred embodiment, such force sensations include damping, inertia, and friction (based on velocity or acceleration). As explained with reference to FIG. 6, these force sensations are more realistically modelled using the reference data rather than the ballistic data. In addition, "clipped" spring forces are preferably mouse-based force sensations (based on mouse position). Clipped spring forces differ from visual spring forces in that clipped spring forces have no visual component, i.e., the cursor does not move during the output of the spring force. Thus, no possibility of a visual-haptic dichotomy exists and the spring force can be calculated using the reference data. If there are multiple mouse-based force sensations to be output, then those forces are all determined using the reference data in step 312 and are summed to get a final mouse-based force.

In step 314, cursor based forces are calculated using ballistic data from step 306. Cursor based force sensations, as referenced herein, are force sensations that are preferably determined based on the ballistic data from step 306 rather than reference data from step 304. Force sensations that would cause a undesirable dichotomy between what the user sees visually on the display device and what the user feels if reference data were used are more likely to be characterized as cursor-based force sensations. For example, in the preferred embodiment, visual spring forces are designated as cursor-based force sensations, since they cause a dichotomy between the visual and haptic experiences of the user as explained above with reference to FIGS. 7a–7f. When a visual spring force is calculated based on ballistic data, then both the cursor position and the spring force are based on the data in the same display frame 28 and no dichotomy occurs. If there are multiple cursor-based force sensations to be output, then all such forces are determined and summed to get a final cursor-based force.

In step 316, the ballistic position determined in step 306 is reported to the host computer 18 as the cursor position. As described with reference to FIG. 6, the cursor position is the position which the local microprocessor has determined will dictate the position of the cursor 180 as it is displayed on the display device 20 in the display frame 28. In some situations the reported cursor position may be a ballistic position further modified by clipping, disturbance filtering, or other processes as explained previously. Step 316 can be performed at any time once the cursor position has been determined, or in parallel with any of steps 308–314 and 318.

In step 318, the forces determined in steps 310, 312, and 314 are summed to result in a total force, which is then output on mouse 12 by the actuators of the interface device. The total force may include other force magnitudes contributed by other sources not shown in the above steps. The process then returns to step 304 to read another mouse position. Thus (as in all the embodiments described herein), all three types of forces (independent, mouse-based, and cursor-based) can be summed together and output on the mouse 12 simultaneously. This can occur based on complex interactions and events of cursor and graphical environment and/or complex types of force sensations. For example, a user may stretch a line in a drawing program using the cursor 180. The stretching function can be implemented by outputting a spring force based on the distance of the stretch, and simultaneously outputting a damping force to slow down the mouse movement and allow better control. Thus, both a mouse-based force (damping) and a cursor-based force (spring) would be summed and output in step 318. Independent forces such as jolts might also be summed with the other forces and output.

The present embodiment (and other embodiments herein) thus use both the reference data from the local frame 30 as well as the ballistic data for the display frame 28 in the determination of particular forces to prevent the visual-feeling dichotomy explained above. The local microprocessor 130 is well-suited to keep track of data from both frames and use data from the appropriate frame as needed. For example, an enclosure command is sent from the host to the microprocessor 130 which defines an enclosure around a window in a GUI. The enclosure has force walls defined around the perimeter of the window that obstruct cursor movement out of the enclosure. When the cursor is moved into the enclosure and is moved against the side of the window, the microprocessor uses ballistic data (display frame) to detect when the cursor interacts with the window side. When the cursor is moved along a side wall of the window, a friction force is output by the microprocessor based on reference data from the local frame, since friction is a mouse-based force. When the user moves the cursor to the corner of the window and stretches the window to a new size, a spring force is output by the microprocessor based on ballistic data from the display frame, since the spring is a cursor-based force. Thus, the microprocessor's ability to select data from different frames allows an efficient implementation of the present invention.

The present embodiment differs from the method 200 of FIG. 6 in that, in method 300, the determination of forces is modified to prevent the visual-feeling dichotomy rather than modifying the cursor position reported to the host to prevent the dichotomy as in method 200. Visual spring forces are characterized as cursor-based force sensations and are determined based on ballistic data rather than a fixed mapping data or reference data. Method 300 is more efficient for the local processor since ballistic data is always reported to the host computer (unless modified by other post-processes). This is unlike method 200, where reference data or constant-mapping data (not ballistic data) is reported to the host computer when outputting a visual spring force and ballistic data is reported to the host during the output of other types of forces, which requires the local microprocessor to monitor the forces and output data from a particular frame depending on the force sensation being output. In addition, the present method of determining a visual spring force based on ballistic data does not distort the spring force appreciably and any reduction in force realism is generally not noticed by the user of the mouse device.

In addition, many other steps may also be involved in the determination and output of forces and the reporting of data to the host which are not pertinent to the present invention and are not detailed herein.

An alternative method to that of FIGS. 6 and 8 for solving the visual-feel dichotomy involves outputting only independent force sensations by mouse system 10 as described with reference to steps 210 and 310. Ballistics can be used freely in such an embodiment with no concern over distorting the force feedback, since forces are determined based only on time and/or other data and are not based on position, velocity, and acceleration of the mouse or cursor. However, in general, more realistic and immersive forces can be implemented using forces based ultimately on the position data of the mouse and/or cursor.

Also, in some embodiments, both methods of FIGS. 6 and 8 (or 9) are available in a single mouse interface system, and the user may select which implementation he or she wishes based on which one feels better to the user. The user may also be able to adjust the strength of the ballistics effect by, for example, sending parameters to the host computer or interface device.

Figure 9:
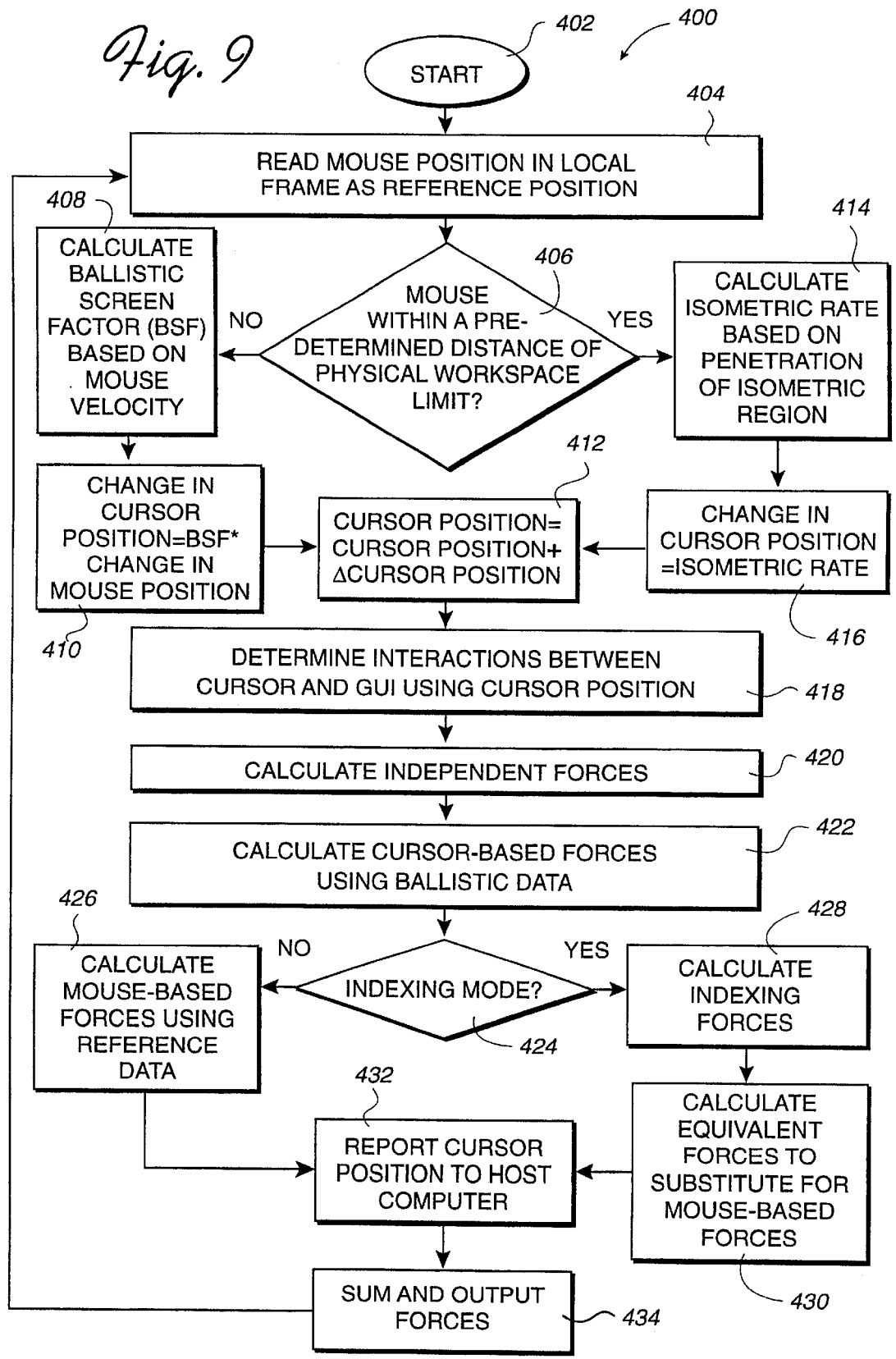
FIG. 9 is a flow diagram illustrating a third embodiment of a method of the present invention for providing enhanced cursor control without compromising force feedback including a first embodiment of an indexing feature of the present invention.

FIG. 9 is a flow diagram illustrating a third, preferred embodiment 400 of the present invention for implementing enhanced cursor control and realistic force feedback in mouse device 10. Method 400 is similar to method 300 and includes a preferred embodiment of the indexing feature of the present invention. This feature allows the user to control the cursor despite any limits to the mouse workspace.

The indexing feature of the present invention allows a user to move the cursor throughout the display frame of the displayed graphical environment without causing the user to experience disconcerting interruptions due to the mouse colliding with physical limits to the mouse workspace. For example, in the described embodiment of FIG. 2, the mouse 12 may be moved in a workspace defined by the walls of guide opening 76. When the guide pin 78 impacts a wall of the opening 76, a limit is reached and the user feels the collision with the hard stop. In other force feedback mouse implementations, hard stops may also be present, since a mechanical linkage that transmits forces must have some physical limits to its degrees of freedom. The stop prevents the user from moving the mouse further in a particular direction and may prevent the user from moving the cursor to a desired target in a GUI (an "under-reach" situation). These hard stops can also be very disconcerting for a user since it interrupts the mouse motion abruptly.

In a traditional mouse, a user may perform indexing to re-center the mouse in its work space and reach a desired target with the cursor by simply lifting up the mouse and placing it closer to the center of a mouse pad or other area, and then resuming mouse movement. When the mouse is lifted, it stops inputting position data to the host, which allows the offset between mouse and cursor to be reduced. However, the force feedback mouse of the described embodiment cannot be indexed like a traditional non-force-feedback mouse by lifting up and physically re-centering the mouse in the workspace, since it is attached to a mechanical linkage. One solution to this problem is to provide an indexing mode, as described in U.S. Pat. Nos. 5,825,308 and 6,100,874, where the user activates a switch or other input device to enter an indexing mode that turns off the reporting of mouse position (i.e. the cursor remains fixed in display frame 28) and the outputting of forces while the user re-centers the mouse. However, such an indexing mode does not address the problem of physical impacts: during normal use the force feedback mouse may collide with the hard stops frequently, which is far more disconcerting for a user than reaching a "soft" limit to mouse movement on a mousepad as in a traditional mouse (where no actual impact between objects occurs). In addition, the hard stops are even more disconcerting and unexpected for a user of a force feedback mouse than a traditional mouse, since the user expects to experience high-fidelity forces based on screen interactions, not a collision with an invisible stop. The fidelity of the force environment is corrupted by the workspace limits.

One way to avoid reaching physical limits to the mouse workspace is to report only (scaled) reference data to the host computer, thus allowing the mouse to control the cursor to all limits of the screen without reaching a limit of the mouse workspace. However, as explained herein, such a solution does not allow the use of ballistics, which provide a greater degree of cursor control. Unfortunately, the use of ballistics causes the mouse position in its local frame 30 to become offset from the cursor position in its display frame 28 and eventually causes the mouse to hit the workspace limits. This is simply caused by the variable scaling of cursor position based on mouse velocity used in ballistics. For example, if a mouse centered in its workspace is moved quickly to the right by 0.5 inches from the center point, the cursor may be moved 8 inches on the screen away from a screen center point. The mouse is then moved back the same 0.5 inches very slowly and is positioned back at the workspace center point. However, the cursor is moved only 1 inch back toward the screen center point due to the ballistics algorithm, creating an offset between the mouse and cursor positions in their respective frames. During more movement, these offsets add up, and the mouse may reach a physical limit to its workspace before the cursor has reached a desired target on the screen. An example of such an offset is shown in FIG. 5 as the distance between the center $C_L$ of the local frame and the center $C_S$ of the screen (display frame). In such an example, the mouse can hit the physical border 401 before the cursor can reach the region 403 on the screen. Offsets in the local and display frames may also occur even when not using ballistics; for example, an application program or operating system may move the cursor independently of the mouse, creating an offset and requiring indexing to reduce or eliminate the offset.

Thus, other methods must be used to provide a force feedback mouse that allows the user greater cursor control using ballistics (and to correct frame offsets that occur for other reasons) while also allowing an indexing-like feature to reduce offsets and preventing the user from experiencing collisions with hard physical limits to the mouse workspace. Since ballistics are implemented in the preferred embodiments, the offsets between local and display frames can become large when controlling a cursor with the mouse device over time, and a solution is needed. Method 400 of the present invention implements such a solution by providing isometric limits to the mouse workspace.

Method 400 begins at 402. In step 404, the mouse position in the local frame 30 is read by the local microprocessor 130 and is the reference position. In step 406, the microprocessor checks whether the mouse is within a predetermined distance of a physical limit to the mouse workspace. In the described embodiment, this predetermined distance is designated an "isometric limit" to the mouse workspace. An isometric limit of the present invention borders an "isometric region" in the mouse workspace which allows a user to control the cursor through isometric control rather than isotonic control. As explained with reference to FIG. 1, isometric control allows the user to control an object based on a rate control paradigm, where an amount of the user's pressure in a direction dictates the speed of a controlled graphical object in that direction. Isotonic control is the normal position control paradigm for mouse-cursor mapping, where the position of the mouse in its workspace correlates to the position of the controlled object in its workspace.

Isometric limits 440 and isometric regions 442 of the present invention are illustrated in FIG. 5. Local frame 30 includes a physical limit or border 444 which represents the physical limits to movement of the mouse 12 in its workspace. For example, in the embodiment of FIG. 2, border 444 can be the physical walls to guide opening 76. Isometric limits 440 are designated according to software (or the equivalent) by the local microprocessor 130 to be at some distance d from the border 444; d can be constant around the border 444, or d can vary at different sides or portions around the workspace. Isometric limits 440 define an isometric region 442 which causes an isometric force to be output on the mouse 12, as described below. The isometric region thus borders an isotonic region 443 which allows normal isotonic mouse positioning. Preferably, the isometric region 442 is an edge region that is fairly small compared to the size of the screen; for example, width w of the isometric region 442 can be 5% of screen length or width or a similar dimension.

Referring back to FIG. 9, if the mouse is not past an isometric limit 440 (i.e., not within the predetermined distance of isometric region 442), then the normal ballistic position of the cursor is determined. This includes step 408, in which the ballistic screen factor (BSF) is calculated based on the mouse velocity, and step 410, in which the change in cursor position is equal to the BSF times the change in mouse position. Then, in step 412, the cursor position (which in this case is the ballistic position) is set equal to the old cursor position plus the change in cursor position determined in step 410. These steps are described with reference to step 206 of FIG. 6. Step 418 is then initiated, as described below.

If the mouse is past an isometric limit 440 in step 406 then the indexing feature of the present invention is performed. In step 414, an isometric rate is calculated based on the penetration of the mouse into the isometric region. The isometric rate determines how fast the cursor is moved isometrically based on the amount of compression into the virtual spring force (explained below). The greater the distance of penetration, the faster the cursor moves. Thus, the isometric rate is proportional to the distance of penetration. In step 416, the change in cursor position is set equal to the isometric rate, and in step 412, the cursor position is set equal to the old cursor position plus the change in cursor position determined in step 416. Thus, the next position of the cursor is determined based on the previous position of the cursor and the position of the mouse in the isometric region 442. This is the rate control aspect of the isometric limits. Since the mouse has moved close to the physical border 444 of the workspace, isotonic control of the cursor is no longer practical. Instead, isometric (rate) control is implemented based on previous cursor positions and the direction of mouse motion and the amount of penetration of the mouse into region 442. The movement of the cursor according to the indexing rate is described in greater detail with respect to FIG. 10b.

In step 418, the microprocessor determines interactions between the cursor and the graphical environment (such as a GUI) using the determined cursor position. In step 420, the microprocessor calculates independent forces, and in step 422, the microprocessor calculates cursor-based forces based on ballistic data. These steps are substantially similar to steps 308, 310, and 314, respectively, of method 300.

In step 424, the microprocessor checks if the mouse is currently in indexing mode, i.e., whether the mouse is in the isometric region 442. If not, then the mouse is in the isotonic region 443 and mouse-based forces are calculated using reference data. This step is substantially similar to step 312 of method 300, described above. The process then continues to step 432, described below. If the mouse is in indexing mode, then in step 428, the microprocessor calculates indexing forces.

In the described embodiment, the indexing force is a resistive spring or restoring force that opposes the mouse's motion from the isotonic region 443 to the isometric region 442. The magnitude and direction of the isometric spring force is determined based on the mouse position within the limit region 442. For example, the spring force may have a magnitude based on the equation F=kx, where k is a spring constant and x is the displacement from an origin or starting position of the spring. In this implementation, k is a predetermined value and x is the displacement of the mouse from the limit 440 into the isometric region 442. The direction of the spring force is the direction opposing the motion of the mouse toward the physical border 444 of the mouse workspace. The isometric spring force simulates a hard surface against which the user may exert pressure to control the cursor isometrically.

Figure 10A:
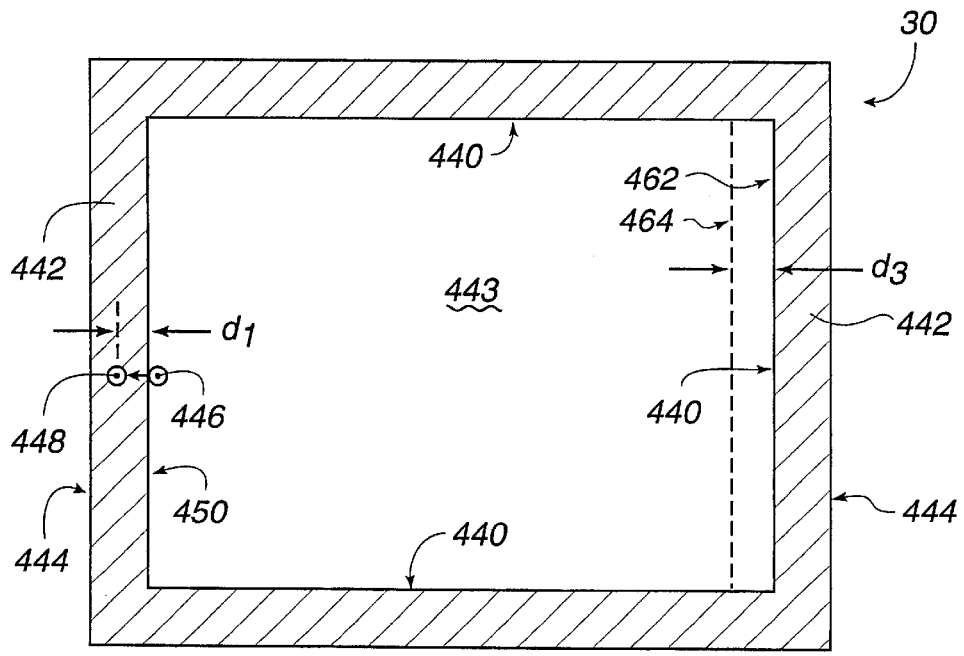
FIGS. 10a–10c are diagrammatic illustrations demonstrating the isometric indexing function of the present invention.

For example, FIG. 10a shows a representation of local frame 30 in which the position of the mouse in the local frame is represented by circle 446. The mouse 446 is moved past the limit 450 into the region 442 to a position corresponding to the circle 448. The distance d1 penetrated into the region 442 is used in the spring force equation as x to determine the magnitude of the opposing spring force. Thus, the further the mouse is moved toward the border 444, the greater the spring force opposing motion in that direction. If the mouse is moved diagonally toward border 444, a diagonal opposing spring force is output.

Figure 10B:
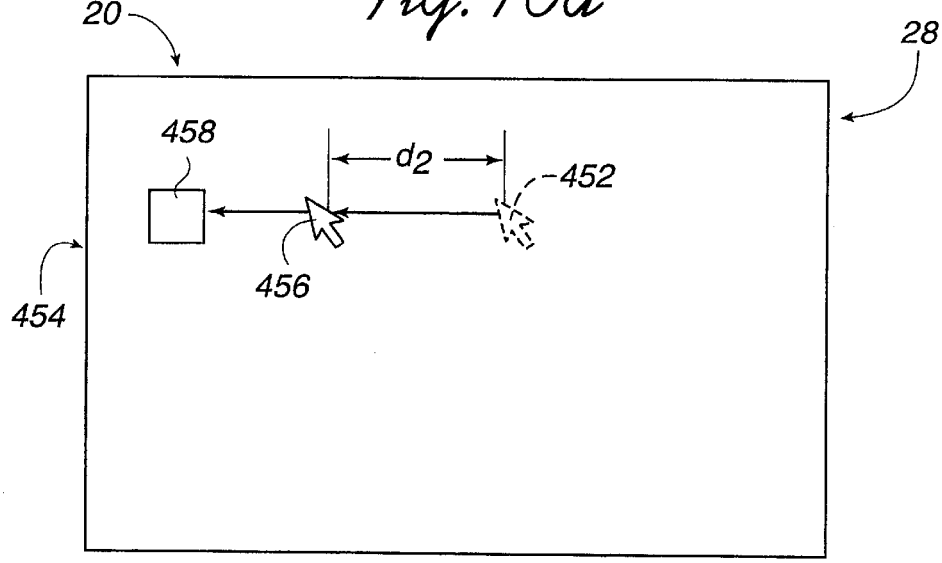

FIG. 10b illustrates the screen 20 of display frame 28 in which cursor 180 is displayed as controlled by the mouse positions of FIG. 14a. The dashed cursor 452 is the position of the cursor when the mouse 12 is at position 446. Cursor 452 is displayed far from the left border 454 of the screen due to offsets that have added up between mouse and cursor position through the use of ballistics. The change in cursor position of cursor 452 (as in step 416) is shown as cursor 456, which is in the same direction as the motion of mouse 12 in region 442 and is a distance d2 from the previous position of the cursor. The distance d2 between the current and previous positions of the cursor is determined by the isometric rate of step 414, determined by distance d1 penetrated into the region 442 by the mouse; the greater the distance d1, the greater the distance d2. Thus, the user can control the speed of the movement of cursor 452 toward border 454 by pushing against the spring force of region 442 by a desired pressure magnitude that causes the mouse to penetrate the region 442 by a desired distance (the distance d1 is preferably used as an indication of the magnitude of input force from the user—the greater the displacement d1, the greater the force or pressure that the user is applying to combat the output force). As long as the user pushes the mouse 12 against the spring force, the cursor 180 will continue to be moved in the appropriate direction at a speed controlled by the penetration distance. In this way, the user uses isometric control to move the cursor on screen 20 once the physical borders 444 are reached by the mouse 12. Once the cursor reaches the edge of the display frame 28 in that direction, the cursor no longer is moved, even if the mouse is still within the isometric region 442.

In effect, the microprocessor is changing or controlling the offset between display frame and local frame when determining cursor position in isometric mode. This is because the mouse may be fixed in position (or only being moved slightly by compressing the spring) in the local frame 30 while the cursor is moving in the display frame 28. As the cursor moves, the offset between frames is reduced. Preferably, the local microprocessor stores an "index value" in local memory 134 as the positional offset between local and display frames and thus may track the offset between frames and may perform cursor positioning in an indexing situation by changing the index value along a direction corresponding to the direction of the penetration of the mouse into the isometric region and at a rate of change dependent on the depth of penetration into the isometric region. This is equivalent to the user in a traditional mouse system lifting up the mouse to manually perform indexing while the cursor remains fixed on the screen. It should be noted that the isometric form of control can be viewed as moving the entire local frame 30 while the cursor stays still with respect to the local frame.

If the user overshoots a desired target using the isometric control, then the user can immediately move the cursor in the opposite toward the target using isotonic position control, since the mouse 12 will have plenty of workspace in that direction. For example, if cursor 456 is accidentally moved past a target icon 458 so that the cursor moves to the left of the icon 458, then the user can move mouse 12 to the right to get the cursor back onto the icon. Since movement of mouse 12 to the right takes the mouse out of region 442, normal isotonic control of the cursor is resumed.

In addition, when using isometric regions 442, the user does not encounter a hard physical impact of the mouse 446 colliding with the physical limit 444. The opposing spring force generated in connection with region 442 effectively softens any movement toward limit 444; and, by the time the mouse 446 gets very close to limit 444 the spring force is usually of high enough magnitude (i.e., d1 is large) to repel the mouse 446 away from the limit 444 so that an impact never occurs or is dramatically softened. This removes any disconcerting hard collisions when reaching limits to the mouse workspace.

Referring to FIG. 9, in step 430, the microprocessor calculates equivalent forces to substitute for the mouse-based forces that would have been output in step 426 but for the indexing mode. This step allows forces resulting from interactions of the cursor with the graphical environment to be felt by the user in indexing mode. Thus, as the user feels the spring force from the isometric limit, the user can also feel forces overlaid on the spring force caused by interactions of the cursor with graphical objects, such as a texture force when the cursor moves over a "bumpy" region in the GUI, or an obstruction force when the cursor impacts a wall. However, when the cursor is in rate (isometric) control or indexing mode, the mouse may not be moving within its workspace; the cursor moves at a rate based on the mouse's penetration into the isometric region, not based on the mouse's movement. Thus, mouse-based forces such as damping, inertia, and friction no longer make sense, since the mouse is not moving in a position control paradigm. Thus, an "equivalent" force to the desired mouse-based force is calculated in step 430 to be substituted for the mouse-based force. This equivalent force may be based on timing data or, alternatively, on cursor positions such as ballistic data (or other scaled data). For example, timing data may be used to calculate an equivalent texture force based on a frequency or duration instead of being based on the position of the mouse with respect to a bump or divot in the GUI. The microprocessor can be sent timing parameters from the host that configures the time-based force sensations (the duration of a jolt force, the frequency of a vibration force, the time to start outputting the force, etc.) Alternatively, forces equivalent to mouse-based forces can be based on cursor position. A simulated divot or detent force when the cursor moves over a border of a window can be calculated based on ballistic (cursor) data instead of the usual mouse-based reference data when the mouse is in indexing mode.

In next step 432, the local microprocessor reports the cursor position determined in step 412 to the host computer, and is similar to step 222 of FIG. 6. In step 434, the forces determined in steps 420, 422, 426, 428 and 430, if any, are all summed together and output by the actuators 64 on the mouse 12. Thus, the resistive spring force is output if the mouse is in indexing mode as well as any forces resulting from interactions in the graphical environment. The process then returns to step 404 to read another mouse position.

In an alternate embodiment, a "hysteresis zone" may be provided between the isometric region 442 and the isotonic region 443 of the local frame. The hysteresis zone creates one location of the limit for entering region 442 and a different location of the limit for exiting region 442. For example, in FIG. 1a, when entering region 442 with the mouse 12, enter limit 462 can be positioned as limit 440; and when the mouse exits region 442, exit limit 464 can be positioned further away from physical border 444. This causes the opposing spring force to remain active a further distance from the border 444 when exiting and "pushes" the mouse and cursor further from the border. This prevents the mouse 12 from being positioned too close to the border and allows some isotonic control of the cursor in all directions for maximum control when exiting isometric mode, i.e., the cursor can be controlled in isotonic mode in a direction toward border 444 for the distance d3 upon exiting region 442. The hysteresis zone also increases stability of the control paradigm, and can enhance the transition from isometric control mode to isotonic control mode since the spring force will have a larger space/range to gradually decrease in magnitude when the mouse is exiting region 442.

Figure 10C:
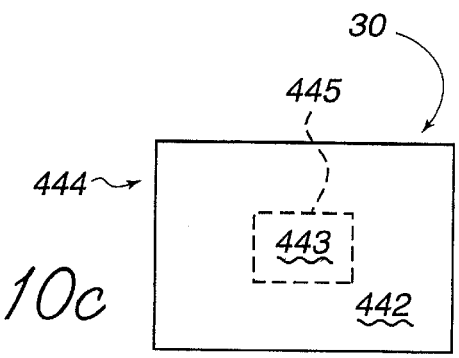

FIG. 10c illustrates an alternate embodiment of the method 400 of FIG. 9 in which the isometric limits as described above are intended for use as a general positioning mechanism for the cursor rather than as an indexing feature only for use near the edge of the mouse workspace. This allows the offsets between frames to be reduced/corrected and also prevents the mouse from hitting physical limits to its workspace due to rate control of the cursor and the resistive spring force. In addition, this method would not use ballistics or other variable scaling of the cursor position and thus allows realistic forces to be output.

Referring to FIG. 10c, the local frame 30 includes physical workspace limits 444 which the mouse cannot move beyond, as explained above. The central isotonic region 443 is defined by dashed line 445, and the surrounding isometric region 442 is defined between the isotonic region 443 and the limit 444. This is similar to the isometric limits of method 400 and FIGS. 5 and 10a, except that the isotonic region 443 of FIG. 10c is much smaller than the equivalent region of FIGS. 5 and 10a. For example, isotonic region 443 can have an area that is ¼ of the workspace area.

If the mouse is positioned in the isotonic region 443, then the cursor position is set equal to (or proportional to) the reference position (the cursor position may be scaled according to a constant scaling factor). Thus, when the mouse is in the isotonic region, cursor positions are directly correlated to the mouse position; no ballistic or other variable scaling processes modify the position of the cursor. If the mouse is positioned in the isometric region, then isometric mode is entered, which is similar to indexing mode described above. The cursor is positioned/moved according to an isometric rate, and an isometric spring force opposes the mouse's motion into the isometric region. The mouse position preferably determines the speed of the cursor as it moves in the isometric region. The microprocessor also overlays any independent and cursor-based forces with the indexing force as in method 400. Thus, when the mouse is moved into the isometric region against the spring force, the cursor is moved according to a rate control paradigm in a direction corresponding to the direction of the mouse, where the amount of compression of the spring determines the speed of the cursor. When the user moves the mouse in the opposite direction back into the isotonic region, isotonic control is immediately restored and the cursor position once more corresponds directly to mouse position. In alternate embodiments, a hysteresis effect can be implemented to provide entry and exit borders to the isometric region at different distances from the physical limit, similar to this effect described above.

It should be noted that, in alternate embodiments, the isometric rate control mode described above can be activated in other ways for indexing purposes, i.e. to position the cursor after a physical limit has been reached by the mouse. For example, instead of entering isometric mode when the cursor gets close to a limit, the user can simply activate isometric mode at any time by pressing and holding down a button on the mouse. Some embodiments of such an isometric mode are described in U.S. Pat. No. 5,825,308. Such an embodiment would also preferably include spring forces on the physical limits 444 of the mouse workspace to soften any hard collisions between the mouse and the limits. As explained above, in such an isometric mode, only non-mouse-based force feedback sensations (e.g. based on time or cursor position) can be output, since mouse-based forces make no sense in a rate control paradigm.

Figure 11:
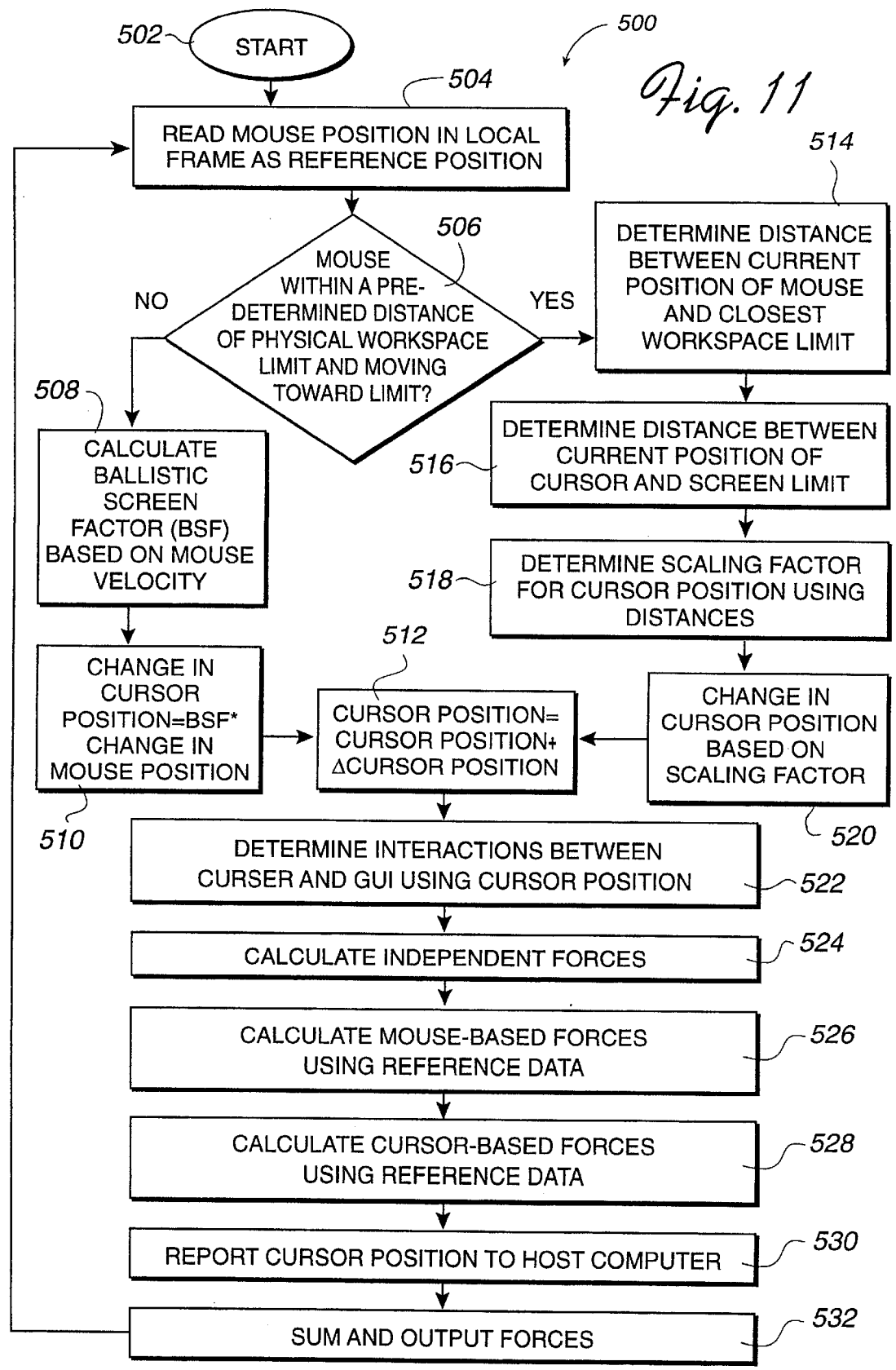
FIG. 11 is a flow diagram illustrating a fourth embodiment of a method of the present invention for providing enhanced cursor control without compromising force feedback including a second embodiment of an indexing feature of the present invention.

FIG. 11 is a flow diagram illustrating another embodiment 500 of the present invention for implementing enhanced cursor control and realistic force feedback in mouse device 10. Method 500 includes an alternative embodiment of the indexing feature of the present invention using an edge scaling feature of the present invention to assure that an "under-reach" situation, where the mouse hits a physical limit in a direction while the cursor still needs to be moved in the corresponding direction on the screen, never occurs.

Method 500 begins at 502. In step 504, the mouse position in the local frame 30 is read by the local microprocessor 130 and is the reference position. In step 506, the microprocessor checks whether the mouse is within a predetermined distance of the physical workspace limit 444 (thus defining a predetermined region next to the physical limit) and whether the mouse is moving toward the physical limit 444. The predetermined distance can be a small distance or region such as 5% of the total screen dimension in that direction. If the mouse is not within this distance or is not moving toward limit 444, then indexing is not necessary and the process continues to steps 508 and 510, where the normal ballistic position of the cursor is determined by calculating a ballistic screen factor (BSF) based on the mouse velocity and where the change in cursor position is equal to the BSF times the change in mouse position, as in FIG. 9. In step 512, the cursor position (which in this case is the ballistic position) is set equal to the old cursor position plus the change in cursor position determined in step 510, and step 522 is then initiated, as described below.

If the conditions of step 506 are met, the process continues to step 514, where the local microprocessor determines the distance between the current position of the mouse and the physical workspace limit 444 that is closest to the current mouse position, i.e., the location of the mouse in the predetermined region. In step 516, the local microprocessor determines the distance between the current position of the cursor and the screen limit in the display frame 28 that corresponds to the closest physical limit to the mouse. For example, if the mouse is closest to the right workspace limit, the distance between the mouse and the right limit is determined in step 514 and the distance between the cursor and the right screen edge is determined in step 516. If the cursor and the mouse have become offset, the distances resulting from steps 514 and 516 can be quite different. In step 518, an appropriate scaling factor is determined for the cursor position utilizing the distances obtained in steps 514 and 516. This scaling factor is chosen to allow movement in the remaining distance in the mouse workspace to control movement of the cursor to the graphical limit of the screen 20. In other words, the local and display frames are recalibrated with respect to each other so that the mouse physical limit is not reached before the cursor reaches the screen edge, i.e., the microprocessor uses the offset between frames to determine a compensating scaling factor.

For example, by moving the mouse to the right the user will encounter the physical limit 444 at a point where the cursor still has 3 inches of screen space to traverse in that direction. The local microprocessor thus will determine a new scaling factor for use in the predetermined region of step 506 that will cause the cursor to reach the end of the screen as the mouse is moved through the region. This is accomplished, for example, by finding the ratio between the distance found in step 516 and the distance found in step 514 to be the scaling factor that is multiplied by the mouse position to map the remaining mouse workspace to the remaining cursor screen space.

In step 520, the change in the cursor position is determined based on the new scaling factor ("edge scaling factor"), and the process then continues to step 512 where the cursor position is determined as the old cursor position plus the change in cursor position from step 520. The edge scaled cursor position thus is set as the cursor position.

In step 522, interactions between cursor and GUI are determined; in steps 524, 526, and 528 independent, mouse based, and cursor based forces are determined; in step 530 the cursor position determined in step 512 is reported to the host computer; and in step 532 the determined forces are summed and the total force is output on the mouse 12. Thus, steps 522–532 are substantially similar to steps 308–318 of FIG. 8, described above. It should be noted that, for cursor based forces in step 528 where the cursor is positioned in the edge-scaled region, those forces are calculated based on the edge-scaled cursor position, not ballistic cursor positions. For example, a visual spring force positioned in the edge scaled region would be calculated based on edge-scaled data, not ballistic data. Alternatively, the method 200 of FIG. 6 can alternatively be used with the indexing steps 506 and 514–520.

Method 500 may cause some problems for the user with fine positioning of the cursor within the edge-scaled region of the screen, since the cursor motion is scaled higher in this region. However, the edge scaling is used only in the direction towards the edge of the screen. Thus, if the user overshoots a target during the edge scaling, the user may move the mouse in the opposite direction to acquire the target, at which point normal or ballistic scaling is used which typically allows easier fine positioning.

Another advantage to the edge scaling process is that, since the cursor accelerates when the mouse is positioned near the limit of the mouse workspace, the user slows down motion of the mouse near the edge to compensate. This tends to diminish the likelihood that the mouse will hit a physical stop with high speed, and thus less of a collision force with the physical stops is felt. In other embodiments, the user may wish to feel the hard stops as an indication of the cursor hitting the edge of the screen.

In an alternate embodiment of the method 500 of FIG. 11, steps 506, 508 and 510 are omitted; the distance between the current mouse position and the workspace limit in the direction of the mouse's movement is determined in step 514, and the distance between the cursor position and the screen limit corresponding to that physical limit is determined in step 516. This allows the local microprocessor to calculate a new scaling factor in real time for all positions of the mouse in its workspace, not just for regions close to the edge of the workspace. For example, the microprocessor would always be examining the distance between the current mouse position and the workspace limit in step 514 and the distance between the cursor and the screen limits in step 516 and scaling the cursor position accordingly. In one example, three "cursor speeds" (i.e., cursor scalings) can be provided: coarse, fine, and intermediate. Coarse and fine speeds are constant mappings of cursor to mouse position allowing different degrees of control. However, the intermediate speed can use this alternative to method 550 to vary the scaling factor according to the offset between local and display frames. In an alternative embodiment, the microprocessor can determine the distance of the mouse and cursor to limits on all sides, such that four different scaling factors can be stored and the one that corresponds to the cursor's direction is used in step 520.

A different embodiment of an indexing feature of the present invention for avoiding the cumulative offset between the local frame and the display frame is "auto centering." This method uses the actuators 64 of the force feedback mouse to automatically reduce the offset between the local frame and the display frames. When auto centering is to be performed, the local microprocessor controls the actuators to move the mouse to the location in the local frame that corresponds to the center of the display frame, thus eliminating the offset between frames. Preferably, auto centering is performed when the user is not grasping the mouse; otherwise, such movement would confuse the user. The auto centering can also be performed only when the offset between frames increases over a predetermined threshold. Alternatively, a special button, switch, or other input device can be provided to the user on mouse 12 or other position which would cause the mouse to be auto centered when the input device is selected by the user.

Figure 12:
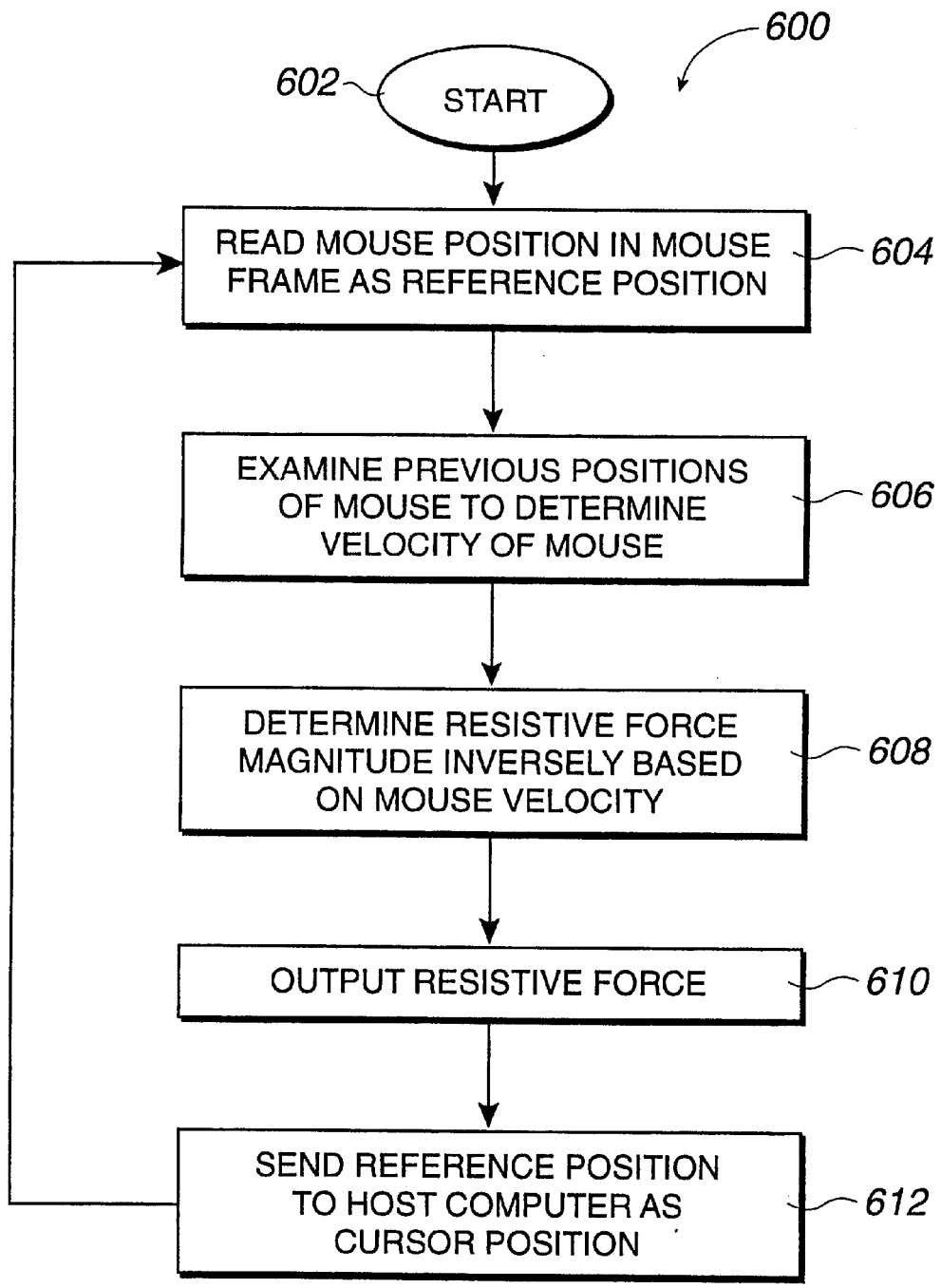
FIG. 12 is a flow diagram illustrating a fifth embodiment of a method of the present invention for providing enhanced cursor control without compromising force feedback.

FIG. 12 is a flow diagram illustrating another embodiment 600 of the present invention for providing greater cursor control without distorting force feedback. In this embodiment, an alternative to traditional ballistics called "adaptive resistance" is used to provide enhanced cursor control.

The method begins at 602. In step 604, the mouse position in the local frame 30 is read by the local microprocessor 130 and is the reference position.

In step 606, the process examines the previous positions of the mouse to determine the velocity of the mouse. This can be performed similarly to the procedure that the ballistics steps of FIG. 6 and FIG. 8 to determine velocity of the mouse; for example, the velocity can be calculated or simply retrieved from a haptic accelerator or other dedicated processing electronics.

In step 608, the process determines a resistive force magnitude that is inversely based on the mouse velocity. In the present embodiment, greater cursor control is provided by outputting forces on the mouse 12 to prevent large displacements of the mouse and thus the cursor. As in ballistics algorithms, when the user is moving the mouse slowly, it is assumed that the user is performing fine positioning of the cursor. Thus, for slower velocities of the mouse 12, a larger magnitude resistive force is output on the mouse, and for higher velocities of the mouse 12, a smaller magnitude resistive force is output on the mouse. In one embodiment, the magnitude of the resistive force can be determined using a discrete function that has one or more distinct velocity thresholds. For example, if the mouse is below a predetermined threshold velocity, a first magnitude of damping resistance is selected, and if the mouse is above that threshold velocity, a 1–5 second, lower magnitude of damping resistance is selected. Alternatively, a continuous function can be referenced to provide a continuously-varying magnitude based on velocity of the mouse. Either a linear or non-linear function can be used.

The resistive force determined in step 608 can be any of a variety of types of resistive forces. For example, a damping force modelled as $F=Bv$, a friction force modelled as $F=f^*(v/|v|)$, or a different dissipative force can be used, or a combination of two or more forces can be provided. The damping constant or friction coefficient can be adjusted as described above based on the mouse velocity. Such dissipative forces slow down and resist quick movement of the mouse so that the user will be able to position the cursor more slowly and accurately within the graphical environment without undesired jitters or overshooting desired targets with the cursor. Conversely, when the user moves the mouse rapidly, small or zero resistive forces are output to allow the user to perform coarse positioning of the cursor.

In step 610, the local microprocessor outputs the resistive force on the mouse 12 using the actuators of the mouse device 10. Preferably, the resistive force that allows fine positioning of the cursor is output in all degrees of freedom of the mouse, i.e., resistance is felt by the user regardless of the direction of the mouse's movement.

In step 612, the local microprocessor sends the reference position obtained in step 604 to the host computer. Step 612 may be performed at any point in the method 600 or simultaneously with the other steps 606–610. Preferably, the reference data is scaled appropriately according to a constant mapping to allow mouse motions to control the cursor to move to all points displayed on the screen. The process then returns to step 604 to read another mouse position.

Since enhanced cursor control is provided using forces and the mouse can control the cursor to all areas of the screen without hitting a physical limit, and, since reference data and not ballistic data is reported to the host computer, the indexing features of the present invention are not required in the embodiment of FIG. 10. However, in some embodiments, an indexing feature may still be desired in case the local and display frames become offset for some reason or to prevent the mouse from colliding hard with a physical limit. The indexing features of FIG. 9 or 11 can be used, for example. If indexing is used, any indexing force may be combined with the resistive force and output in step 610.

Figure 13:
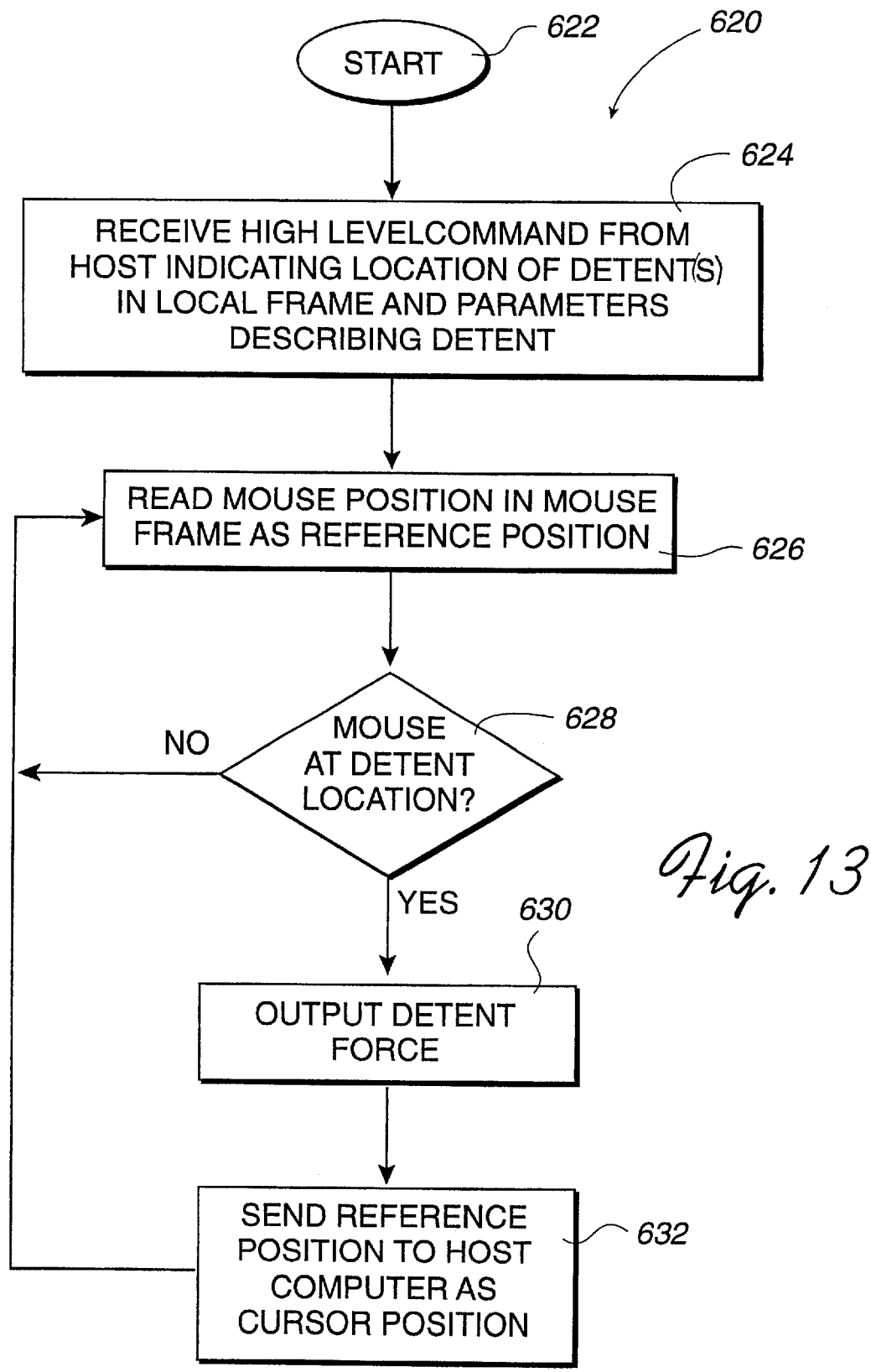
FIG. 13 is a flow diagram illustrating a sixth embodiment of a method of the present invention for providing enhanced cursor control without compromising force feedback.

FIG. 13 is a flow diagram illustrating another embodiment 620 of the present invention for providing an enhanced degree of cursor control without distorting force feedback. In this embodiment, force "detents" are used to assist the user in finely positioning the cursor at a desired target.

The method begins at 622. In step 624, a high level command is received from the host computer indicating the location of detent(s) in the local frame 30 and parameters describing characteristics of the detent(s). A "detent" is a force sensation that assists a user in moving the cursor to a particular point or area and reduces the ability of the user to move the cursor away from that point or area (such as a "snap to" effect). This simulates the feel of a physical detent, divot, or valley in a physical surface. For example, when the cursor is moved within a predetermined distance of a point, an attractive force can be output on the mouse 12 which helps guide the cursor to the point. Or, a spring force can be provided in a region surrounding a point or area and be oriented in a direction toward the point or area, so that when the cursor is in the surrounding region, the spring force influences the cursor toward the point or region. The spring force also has the effect of resisting cursor motion away from the point or area once the cursor has acquired the point or area.

Since detents assist a user in acquiring targets, they help the user in fine positioning of the cursor. Thus a target such as an icon can be implemented as a detent with a spring force provided in a region surrounding the icon or a center point of the icon. It is easier for the user to acquire targets that include detents, so the need for ballistics to allow fine positioning is much reduced.

In the preferred embodiment, the host computer sends data to the local microprocessor indicating the locations of detent in the graphical environment. Locations of detents within the entire graphical environment can be sent, or just detents within a predetermined rejoin or surrounding the present location of the cursor. The host also sends parameters indicating the magnitude of the detent force, the shape of the detent force or shape of the region where the detent exists, the direction of the force detent force, etc. Force detents are described in greater detail in co-pending patent application Ser. No. 08/566,282, now U.S. Pat. No. 5,734,373, which is hereby incorporated by reference herein. Step 624 can be performed at any time during the process and can be repeated to update the local microprocessor's knowledge of the detents in the graphical environment.

In step 626, the mouse position in the local frame 30 is read by the local microprocessor 130 and is the reference position. In step 628, the microprocessor checks whether the mouse is currently at a location to be affected by a force detent. The local microprocessor preferably checks the detent data sent to it by the host to determine if the mouse is positioned at the location of a detent. Thus, the microprocessor assumes that the cursor is positioned in the display frame 28 (the screen) at a corresponding position to the mouse in the local frame 30 according to a constant mapping. If the mouse is not currently at a detent location, the process returns to step 626 (or checks for other interactions of the cursor with the GUI which may cause forces to be output). If the mouse is at the location of the detent, step 630 is initiated.

In step 630, the local microprocessor controls the output of a detent force on the mouse 12 by actuators 64 according to a locally stored force model and according to any parameters sent by the host computer. In step 632, the local microprocessors sends the reference position of the mouse obtained in step 624 to the host computer as the cursor position. As described above, the reference position may be scaled according to a constant (non-ballistic) mapping. The process then returns to step 626 to read another mouse position.

As in the method of FIG. 12, indexing may be used in the method 620 of FIG. 13, although it is not necessary since ballistic positioning is not used. Modifications for indexing are similar as described above.

Alternatively, the method of FIG. 13 (or a similar method, such as that of FIG. 14) can be implemented using force "surfaces" instead of detents to assist in fine positioning of the cursor. An obstruction force simulating the feel of encountering a hard surface such as a wall can be provided on appropriate graphical objects or in a region around the cursor to help guide the cursor in desired direction and/or toward a desired target. For example, a force "enclosure" can be provided around a region once the cursor is positioned within the region. An enclosure is a box-like object having sides characterized by wall and/or texture forces. For example, size, location, wall stiffness and width, surface texture and friction of the wall, clipping, force characteristics of the interior region of the enclosure, scroll surfaces, and the speed of the user object necessary to engage the forces of the enclosure can all be varied, as described in greater detail in U.S. Pat. No. 6,078,308, incorporated by reference herein.

Each side of the enclosure would thus resist movement of the cursor out of the enclosure and would allow the user to more easily acquire a target inside the enclosure. In other situations, a hard surface on an object can guide the cursor along an edge toward a target at the end of the edge. Similarly, two surfaces forming a channel can help maintain the cursor on a slider bar or other linear region or object. In other embodiments, a field of surfaces or an enclosure can be provided around the cursor, whatever its location, when the mouse moves in a way to indicate fine positioning is desired, as described below with reference to FIG. 14.

Figure 14:
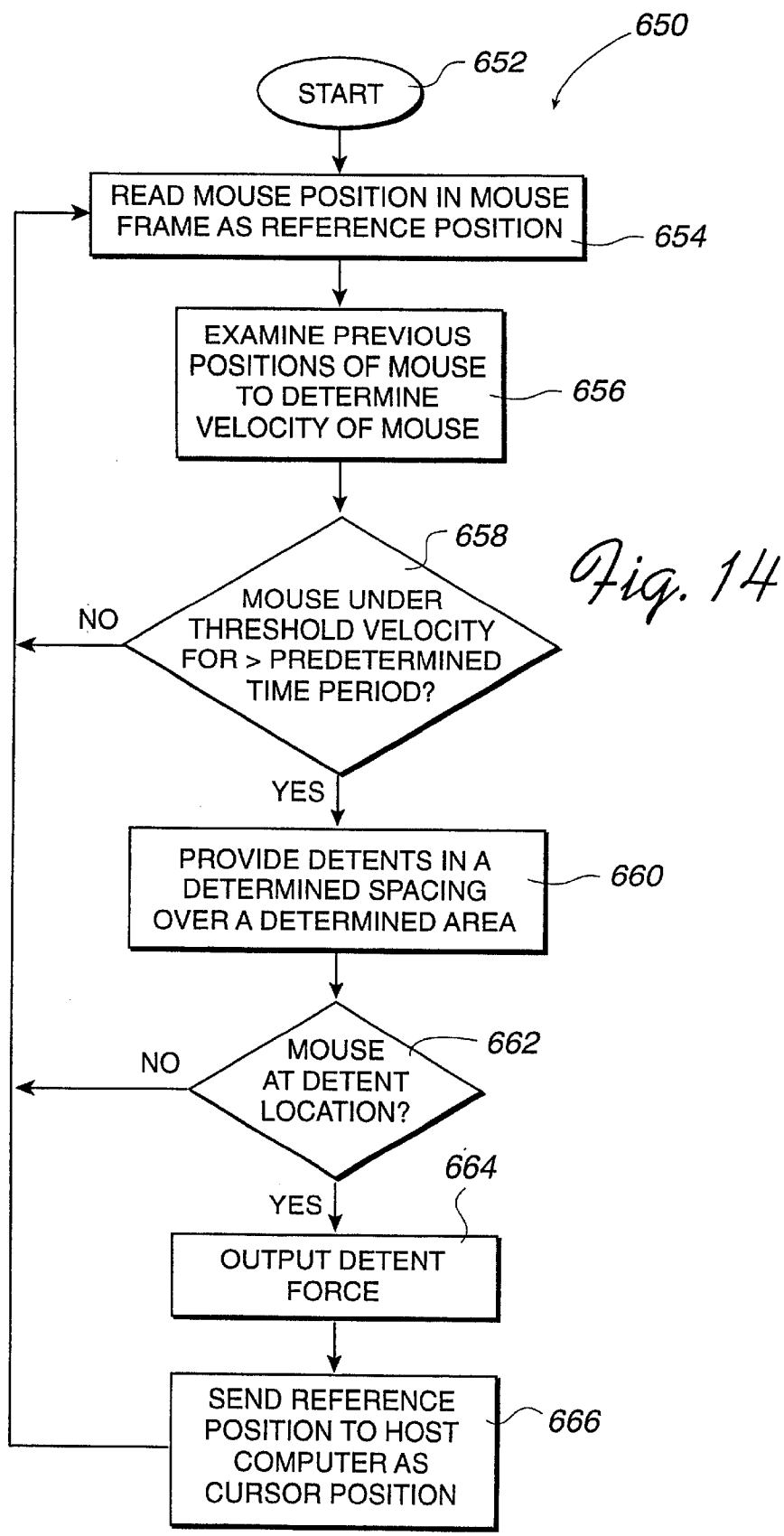
FIG. 14 is a flow diagram illustrating a seventh embodiment of a method of the present invention for providing enhanced cursor control without compromising force feedback.

FIG. 14 is a flow diagram illustrating another embodiment 650 for providing an enhanced degree of cursor control without distorting force feedback. In this embodiment, force detents are provided in a region around the cursor when the user is believed to need to finely position the cursor.

The process begins at 652. In step 654, the mouse position in the local frame 30 is read by the local microprocessor 130 and is the reference position. In step 656, the process examines the previous positions of the mouse to determine the velocity of the mouse. This is similar to the procedure that the ballistics steps in FIGS. 6 and 8 and step 606 of FIG. 12 perform to determine velocity.

In step 658, the process determines whether the mouse velocity is less than a threshold velocity, and whether the mouse has been under the threshold velocity for greater than a predetermined time period. The threshold velocity is preferably some small velocity below which the user typically desires to finely position the cursor in the graphical environment. The predetermined time period is preferably a time period found to typically pass when the user is having trouble acquiring a target or performing some other fine positioning task (and which can depend on the task). For example, a time period of 3 seconds for a particular task might be used. In an alternative embodiment, only the velocity of the mouse is checked in step 658 and the time period is ignored.

If the mouse velocity is above the threshold velocity or is not under the threshold velocity for the minimum time, the process returns to step 654 (of course, forces caused by other interactions of the cursor in the GUI or other events can be output as described above). If the mouse velocity is less than the threshold velocity for the minimum time, then the process continues to step 660, where a field of multiple force detents are provided in a determined spacing over a determined area or region. Thus, the detents are not provided if the mouse is moving over the threshold velocity, since they would only encumber fast, coarse motion of the mouse and cursor. However, if the user is moving the mouse slowly for the predetermined time period, the local processor assumes that the user needs assistance in fine positioning, and provided the field of force detents. The detents are preferably similar to the detents described with reference to FIG. 13, and output forces to slow quick motion of the mouse and cursor. The force detents can be provided in a rectangular grid, a series of circular radii, or in other configurations. These configurations can be predetermined, selected by the user, or may vary depending on the nearest region or object in the GUI. The field of detents can cover the entire screen or display frame, or may be provided only in a predefined smaller region surrounding the cursor in a predetermined shape or a shape that differs according to the region or nearest object of the GUI. In addition, large detents or small detents can be provided, and the spacing of the detents from each other can be varied as desired. For example, a grid of detents can be provided that corresponds to a grid of snap points displayed on the screen by a drawing program. In a word processor, the detents can correspond to letter spacing and line spacing of the current document. Each detent can also correspond to each pixel displayed on the screen. Ideally, the detents are spaced at the minimum resolution required for a give positioning task. For example, sensors 62 on the mouse 12 can track 1000 points per square inch. This high resolution is not required for the host computer, since, for example, 300 pixels are displayed per square inch (300 dpi). Thus, detents need only be provided at the 300 per square inch resolution. For some tasks, detent spacing greater than the pixel spacing can be provided.

The local microprocessor can provide the detent field entirely independently from the host computer. Alternatively, the host computer can send high level commands to enable the force detent feature and to characterize the detent spacing, force intensity, and other parameters of the detents (thus allowing the user to enable and/or characterize detents if desired).

In next step 662, the local microprocessor checks whether the mouse is at a detent location. If not, the process returns to step 654. If so, the local microprocessor controls the actuators 64 to output a detent force in step 664, which is similar to outputting forces in the above embodiments. In next step 666, the local microprocessor sends the reference position (or a position scaled according to a constant mapping) to the host computer as the cursor position (step 666 can be performed at any time after step 654 or in parallel with the other steps).

Method 650 is easier to implement than the process 620 of FIG. 13, since the local microprocessor does not need to continually be updated with detent locations in the graphical environment from the host computer and does not need to check cursor position and the detents in the graphical environment to determine if a detent is encountered. Instead, the microprocessor need only look at mouse location in the local frame and may implement the detents independently of the host. As with FIGS. 12 and 13, indexing is optional in this embodiment and may be provided as described above.

While this invention has been described in terms of several preferred embodiments, it is contemplated that alterations, permutations and equivalents thereof will become apparent to those skilled in the art upon a reading of the specification and study of the drawings. For example, although examples in a GUI are described, the embodiments herein are also very well suited for other two-dimensional graphical environments and especially three-dimensional graphical environments, where a user would like fine positioning in manipulating 3-D objects and moving in a 3-D space. For example, the isometric limits are quite helpful to move a cursor or controlled object in a 3-D environment further than physical limits of the interface device allow.

In addition, many different types of forces can be applied to the user object 12 in accordance with different graphical objects or regions appearing on the computer's display screen and which may be mouse-based force sensations or cursor-based force sensations. Also, the various features of the embodiments herein can be combined in various ways to provide additional embodiments of the present invention. In addition, many types of user objects and mechanisms can be provided to transmit the forces to the user, such as a mouse, trackball, joystick, stylus, or other objects. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method, comprising:

sensing a movement of a manipulandum of an interface device with respect to a fixed local frame, a movement of a cursor in a graphical display being associated with the movement of the manipulandum;

deriving a cursor position using a scale factor based on the sensed movement of the manipulandum and the movement of the cursor, the scale factor being associated with a velocity of the manipulandum with respect to the fixed local frame;

determining a tactile sensation to be output based on the scaled cursor position; and outputting the tactile sensation by sending a signal to a motor included in the interface device.

2. The method of claim 1, wherein the cursor position is a ballistics position, the ballistics position being the sensed movement of the manipulandum modified by a ballistics algorithm in which a position of the cursor is mapped to a position of the manipulandum based on the scale factor.

3. The method of claim 1, wherein the position of the cursor is mapped according to a constant mapping when the tactile sensation to be output is a virtual spring force.

4. The method of claim 1, wherein the tactile sensation is determined based on one of a motion and a position of the manipulandum with respect to the fixed local frame, the cursor position being based on previous cursor positions in the graphical display.

5. The method of claim 4, wherein the tactile sensation is determined based on the position of the manipulandum if the tactile sensation is not a virtual spring force, and is determined using the ballistics position if the tactile sensation is a virtual spring force, and is determined using neither manipulandum position nor ballistic position if the tactile sensation is determined independently of the motion or position of the manipulandum.

6. The method of claim 5, wherein the tactile sensation determined independently of the motion or the position of the manipulandum includes at least one of a vibration, jolt or other tactile sensation based solely on time parameters.

7. The method of claim 1, wherein the tactile sensation output allows fine positioning and coarse movement of the cursor within the graphical display.

8. The method of claim 7, wherein the tactile sensation includes a resistive force having a magnitude inversely proportional to the velocity of the manipulandum in the fixed local frame to allow enhanced fine positioning while not affecting coarse movement of the cursor.

9. The method of claim 1, wherein said manipulandum is a mouse.

10. The method of claim 1, further comprising determining if an indexing feature should be performed, the indexing feature allowing control of an offset between the position of the manipulandum in the fixed local frame and the position of the cursor on the graphical display.

11. The method of claim 1, wherein a local microprocessor, included with the interface device is configured to determine the tactile sensation based on the scaled cursor position.

12. The method of 1, wherein the scaled cursor position allows fine positioning of the cursor, the scaling of the cursor position being performed only when fine positioning is determined to be necessary for positioning the cursor.

13. The method of claim 12, wherein fine positioning is determined to be necessary for positioning the cursor when the cursor moves within a region of predetermined size for longer than a predetermined time period.

14. A method, comprising:
   receiving a sensor signal associated with a position of a manipulandum of an interface device with respect to a reference point;
   updating data values associated with a movement of a cursor in a graphical user interface based on a scale factor, the scale factor based on a velocity of the manipulandum with respect to the reference point; and
   sending a tactile sensation signal based on the scale factor.

15. The method of claim 14, wherein the updating data values includes modifying the sensed position of the manipulandum by a ballistics algorithm.

16. The method of claim 14, wherein the tactile sensation signal is associated with a virtual spring force and the a cursor position is mapped to the position of the manipulandum.

17. The method of claim 14, wherein a magnitude of a tactile force associated with the tactile sensation signal is inversely proportional to the velocity of the manipulandum.

18. The method of claim 14, wherein the tactile sensation signal is associated with a tactile sensation, the tactile sensation being independent of the motion or the position of the manipulandum and includes at least one of a vibration, jolt or other tactile sensation based on time parameters.

19. The method of claim 14, further comprising:
   applying an indexing feature configured to control an offset between the position of the manipulandum and the position of the cursor on the graphical display.

20. The method of claim 14, wherein the scaling only occurs when the cursor moves within a region of predetermined size on the graphical display for a predetermined period of time.

21. A processor-readable medium storing code representing instructions to cause a processor to:
   receive a sensor signal associated with a position of a manipulandum of an interface device with respect to a reference point;
   update data values associated with a movement of a cursor in a graphical user interface based on a scale factor, the scale factor based on a velocity of the manipulandum with respect to the reference point; and
   send a tactile sensation signal based on the scale factor.

* * * * *

UNITED STATES PATENT AND TRADEMARK OFFICE
CERTIFICATE OF CORRECTION

PATENT NO. : 6,894,678 B2
DATED : May 17, 2005
INVENTOR(S) : Rosenberg et al.

It is certified that error appears in the above-identified patent and that said Letters Patent is hereby corrected as shown below:

Title page,
Item [56], References Cited, OTHER PUBLICATIONS,
"Yokokohji, et al.," reference, replace "Yokokohji, et al., "What ou can" with
-- Yokokohji, et al., What you can --; insert
-- Hannaford et al., "Force-Feedback Cursor Control", NASA Tech Briefs, vol. 13, No. 11, Item #21, 1989, pp. 1-4.--; and replace
"Pimentel et al., "Virtual Reality: through the new looking glass." $2^{nd}$ Edition; McGraw-Hill, ISBN 0-07-050167-X, pp. 41-202, 1004." with
-- Pimentel et al., "Virtual Reality: through the new looking glass." 2nd Edition; McGraw-Hill, ISBN 0-07-050167-X, pp. 41-202, 1994. --.

Column 13,
Line 43, replace "5,634,373" with -- 5,734,373 --.

Column 34,
Line 17, replace "1a, when entering" with -- 10a, when entering --.

Column 39,
Line 30, replace "rejoin" with -- region --.
Line 34, replace "force detent force," with -- detent force, --.

Column 42,
Lines 42 and 45, replace "claim 1," with -- claim 2, --.

Signed and Sealed this

Fourteenth Day of February, 2006

JON W. DUDAS
*Director of the United States Patent and Trademark Office*